US012040543B2

(12) United States Patent
Hartner et al.

(10) Patent No.: US 12,040,543 B2
(45) Date of Patent: Jul. 16, 2024

(54) RADIO-FREQUENCY DEVICES AND METHODS FOR PRODUCING RADIO-FREQUENCY DEVICES

(71) Applicant: Infineon Technologies AG, Neubiberg (DE)

(72) Inventors: Walter Hartner, Bad Abbach-Peissing (DE); Tuncay Erdoel, Unterhaching (DE); Klaus Elian, Alteglofsheim (DE); Christian Geissler, Teugn (DE); Bernhard Rieder, Regensburg (DE); Rainer Markus Schaller, Saal a.d. Donau (DE); Horst Theuss, Wenzenbach (DE); Maciej Wojnowski, Munich (DE)

(73) Assignee: Infineon Technologies AG, Neubiberg (DE)

( * ) Notice: Subject to any disclaimer, the term of this patent is extended or adjusted under 35 U.S.C. 154(b) by 98 days.

(21) Appl. No.: 17/648,730

(22) Filed: Jan. 24, 2022

(65) Prior Publication Data

US 2022/0247089 A1 Aug. 4, 2022

(30) Foreign Application Priority Data

Feb. 1, 2021 (DE) ........................ 102021102228.2

(51) Int. Cl.
*H01Q 13/06* (2006.01)
*H01Q 1/22* (2006.01)
(Continued)

(52) U.S. Cl.
CPC ........... *H01Q 13/06* (2013.01); *H01Q 1/2283* (2013.01); *H01Q 1/526* (2013.01); *H01Q 23/00* (2013.01)

(58) Field of Classification Search
None
See application file for complete search history.

(56) References Cited

U.S. PATENT DOCUMENTS 4,932,673 A 6/1990 Domnikov et al.
5,770,981 A 6/1998 Koizumi et al.
(Continued)

FOREIGN PATENT DOCUMENTS

CN 112054270 A 12/2020
DE 102014118563 A1 6/2015
(Continued)

OTHER PUBLICATIONS

KGS Kitagawa Industries America, Inc., "EZ Foam," Specification Sheet, 1 page.

*Primary Examiner* — Ab Salam Alkassim, Jr.
*Assistant Examiner* — Anh N Ho
(74) *Attorney, Agent, or Firm* — Harrity & Harrity, LLP

(57) ABSTRACT

A radio-frequency device comprises a printed circuit board and a radio-frequency package having a radio-frequency chip and a radio-frequency radiation element, the radio-frequency package being mounted on the printed circuit board. The radio-frequency device furthermore comprises a waveguide component having a waveguide, wherein the radio-frequency radiation element is configured to radiate transmission signals into the waveguide and/or to receive reception signals via the waveguide. The radio-frequency device furthermore comprises a gap arranged between a first side of the radio-frequency package and a second side of the waveguide component, and a shielding structure, which is configured: to permit a relative movement between the radio-frequency package and the waveguide component in a first direction perpendicular to the first side of the radio-frequency package, and to shield the transmission signals (Continued)

and/or the reception signals in such a way that a propagation of the signals via the gap is attenuated or prevented.

20 Claims, 9 Drawing Sheets

(51) Int. Cl.
*H01Q 1/52* (2006.01)
*H01Q 23/00* (2006.01)

(56) References Cited

U.S. PATENT DOCUMENTS

| | | | | |
|---|---|---|---|---|
| 2009/0058571 | A1 | 3/2009 | Takemoto et al. | |
| 2014/0320231 | A1 | 10/2014 | Seler et al. | |
| 2016/0247780 | A1 | 8/2016 | Seler et al. | |
| 2018/0034124 | A1 | 2/2018 | Bolander et al. | |
| 2019/0348746 | A1* | 11/2019 | Gupta | H01Q 1/50 |
| 2020/0365535 | A1* | 11/2020 | de Graauw | G01S 7/032 |
| 2020/0400815 | A1 | 12/2020 | Wintermantel | |
| 2021/0075081 | A1* | 3/2021 | Kamphuis | H01L 24/48 |
| 2021/0210832 | A1* | 7/2021 | Brandenburg | H01Q 1/02 |
| 2021/0218125 | A1* | 7/2021 | Ali | H01Q 13/06 |
| 2021/0225719 | A1 | 7/2021 | Seler et al. | |

FOREIGN PATENT DOCUMENTS

| | | | |
|---|---|---|---|
| DE | 102015112861 | A1 | 2/2016 |
| DE | 102014105845 | B4 | 6/2019 |
| DE | 102020101293 | A1 | 7/2021 |
| WO | 2019166064 | A1 | 9/2019 |

* cited by examiner

RADIO-FREQUENCY DEVICES AND METHODS FOR PRODUCING RADIO-FREQUENCY DEVICES

CROSS REFERENCE TO RELATED APPLICATION

This application claims priority to German Patent Application No. 102021102228.2, filed on Feb. 1, 2021, the contents of which are incorporated by reference herein in their entirety.

TECHNICAL FIELD

The present disclosure generally relates to radio-frequency (RF) technology. In particular, the present disclosure relates to RF devices and methods for producing RF devices.

BACKGROUND

RF devices can be used in automotive safety applications, for example. By way of example, radar sensors can be used for blind spot detection, automated speed regulation, collision avoidance systems, etc.

SUMMARY

Various aspects relate to a radio frequency (RF) device. The RF device comprises a printed circuit board and an RF package having an RF chip and an RF radiation element, the RF package being mounted on the printed circuit board. The RF device furthermore comprises a waveguide component having a waveguide, wherein the RF radiation element is configured to radiate transmission signals into the waveguide and/or to receive reception signals via the waveguide. The RF device furthermore comprises a gap arranged between a first side of the RF package and a second side of the waveguide component. The RF device furthermore comprises a shielding structure, which is configured to permit a relative movement between the RF package and the waveguide component in a first direction perpendicular to the first side of the RF package, and to shield the transmission signals and/or the reception signals in such a way that a propagation of the signals via the gap is attenuated or prevented.

Various aspects relate to a method for producing an RF device. The method comprises mounting an RF package having an RF chip and an RF radiation element on a printed circuit board. The method furthermore comprises arranging a waveguide component having a waveguide, wherein the RF radiation element is configured to radiate transmission signals into the waveguide and/or to receive reception signals via the waveguide, wherein a gap is arranged between a first side of the RF package and a second side of the waveguide component. The method furthermore comprises forming a shielding structure, which is configured to permit a relative movement between the RF package and the waveguide component in a first direction perpendicular to the first side of the RF package, and to shield the transmission signals and/or the reception signals in such a way that a propagation of the signals via the gap is attenuated or prevented.

BRIEF DESCRIPTION OF THE DRAWINGS

RF devices and associated production methods in accordance with the disclosure are explained in greater detail below with reference to drawings. The elements shown in the drawings are not necessarily rendered in a manner true to scale relative to one another. Identical reference signs may designate identical components.

DETAILED DESCRIPTION

In the following detailed description, reference is made to the accompanying drawings, which show for illustration purposes specific aspects and implementations in which the disclosure can be implemented in practice. In this context, direction terms such as, for example, "at the top", "at the bottom", "at the front", "at the back", etc. can be used with respect to the orientation of the figures described. Since the components of the implementations described can be positioned in different orientations, the direction terms can be used for illustration purposes and are not restrictive in any way whatsoever. Other aspects can be used and structural or logical changes can be made, without departing from the concept of the present disclosure. In other words, the following detailed description should not be understood in a restrictive sense.

In some cases, the RF signals provided by an RF device can be emitted by antennas arranged on a printed circuit board. For this purpose, the printed circuit board generally has to have an expensive RF laminate for the RF signal paths. Furthermore, in this approach, transport losses can occur during signal transfer between the RF chip and the RF antennas. Some implementations described herein relate to a cost effective RF device having low signal losses. Schematic views of RF devices in accordance with the disclosure are described below. In this case, the RF devices can be illustrated in a general way in order to describe aspects of the disclosure qualitatively. The RF devices can in each case have further aspects that are not illustrated in the figures for the sake of simplicity. For example, the respective RF devices can be extended by any aspects described in association with other devices or methods in accordance with the disclosure.

Figure 1:
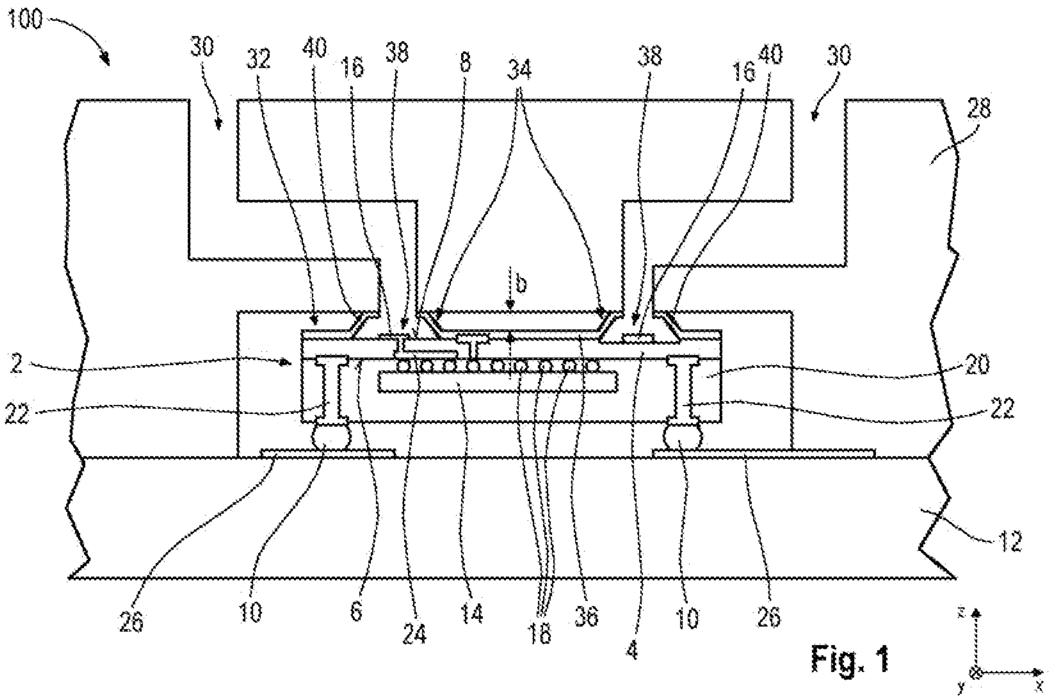
FIG. 1 schematically shows a cross-sectional side view of an RF device 100 in accordance with the disclosure.

FIG. 1 schematically shows a cross-sectional side view of an RF device 100 in accordance with the disclosure. The RF device 100 can comprise an RF package 2. The RF package 2 can comprise a substrate 4 having a lower surface 6 and an upper surface 8. The RF package 2 can comprise on its underside at least one connection element 10, which can be configured to electrically and mechanically connect the RF package 2 to a printed circuit board 12. The printed circuit board 12 may or may not be regarded as part of the RF device 100. The printed circuit board 12 can comprise on its top sides and/or underside electrically conductive structures 26, such as conductor tracks, for example, to which the connection elements 10 can be electrically and mechanically coupled. Two connection elements 10 are shown by way of example in FIG. 1. In some implementations, the number of connection elements 10 can deviate therefrom. For example, the number of connection elements 10 can be greater than two. The RF package 2 can furthermore comprise an RF semiconductor chip 14 arranged on the lower surface 6 of the substrate 4. One or more RF radiation elements 16 can be arranged on the upper surface 8 of the substrate 4.

The substrate 4 can be a ball grid array (BGA) substrate, for example. Furthermore, the RF chip 14 can be electrically and mechanically connected to the substrate 4 by way of connecting elements 18 in particular using a flip-chip technique. The substrate 4 and the RF chip 14 can thus form in particular a flip-chip ball grid array (FCBGA). The RF package 2 shown in FIG. 1 can be regarded as by way of example. Further types of RF packages such as can be contained in an RF device in accordance with the disclosure are shown and described in the figures described further below.

In the implementation shown in FIG. 1, the RF chip 14 can be at least partly encapsulated by an encapsulation material 20. In some implementations, the RF chip 14 can be a "bare die", e.g., an unpackaged semiconductor chip. The encapsulation material 20 can protect the RF chip 14 against external influences, such as moisture or mechanical impacts, for example. The encapsulation material 20 can include, for example, at least one from a mold compound, a laminate, an epoxy, a filled epoxy, a glass-fiber-filled epoxy, an imide, a thermoplastic, a thermosetting polymer, and a polymer mixture. The encapsulation material 20 can be arranged on the lower surface 6 of the substrate 4. In this case, the side surfaces of the encapsulation material 20 and of the substrate 4 can terminate flush with one another. One or more electrical through connections 22 can extend from the underside of the encapsulation material 20 to the top side of the encapsulation material 20. An electrical connection between the substrate 4 and the connection elements 10 can be provided via the through connections 22.

The substrate 4 can comprise one or more layers composed of a ceramic or dielectric material. Structures 24 for carrying and/or redistributing electrical signals can be embedded into the layers. These signal-carrying structures 24 can comprise through contacts and conductor tracks. The conductor tracks can be arranged between the ceramic or dielectric layers on different planes and can be electrically connected to one another via through contacts extending substantially vertically. In this case, the through contacts can extend partly, but not necessarily completely, through the substrate 4. The signal-carrying structures 24 can be configured in particular to electrically couple the RF chip 14 and the through contacts 22 extending through the encapsulation material 20. An electrical connection between the RF chip 14 and the connection elements 10 can thus be provided via the through contacts 22 and the signal-carrying structures 24. Furthermore, the signal-carrying structures 24 can be configured very generally to provide electrical connections between the surfaces 6 and 8 of the substrate 4.

The RF chip 14 can in particular comprise or correspond to a monolithic microwave integrated circuit (MMIC). The RF chip 14 can operate in various frequency ranges. Accordingly, the RF radiation elements 16 electrically coupled to the RF chip 14 can be configured to emit and/or to receive signals having frequencies in the frequency ranges. In some implementations, the RF chip 14 can operate in a radio-frequency or microwave frequency range that can generally range from approximately 10 GHz to approximately 300 GHz. By way of example, accordingly, circuits integrated into the RF chip 14 can operate in a frequency range of greater than approximately 10 GHz, and the RF radiation elements 16 can emit and/or receive signals having a frequency of greater than approximately 10 GHz. Microwave circuits of this type can comprise for example microwave transmitters, microwave receivers, microwave transceivers, microwave sensors, or microwave detectors. The RF devices described herein can be used for example for radar applications in which the frequency of the RF signal can be modulated.

Radar microwave devices can be used for example in automotive or industrial applications for distance determining/distance measuring systems. By way of example, automatic vehicle speed regulating systems or vehicle anti-collision systems can operate in the microwave frequency range, for example in the 24 GHz, 77 GHz or 79 GHz frequency bands. In some cases, the use of such systems can provide constant and efficient driving of a vehicle. An efficient manner of driving can, for example, lower the fuel consumption and thus enable energy savings. Furthermore, abrasion of vehicle tires, brake disks and brake pads can be reduced and particulate matter pollution can thus be reduced. Improved radar systems such as are described herein can thus contribute at least indirectly to solutions based on green technology, e.g., to climate-friendly solutions that provide a reduction of energy consumption.

Alternatively or additionally, the RF chip 14 can operate in a Bluetooth frequency range. Such a frequency range can comprise for example an ISM (Industrial, Scientific and Medical) band between approximately 2.402 GHz and approximately 2.480 GHz. The RF chip 14 or circuits integrated into the RF chip 14 can accordingly more generally be configured to operate in a frequency range of greater than approximately 1 GHz, and the RF radiation elements 16 can accordingly be configured to emit and/or to receive signals having a frequency of greater than approximately 1 GHz.

The RF device 100 can comprise a waveguide component 28 having one or more waveguides 30. The waveguide component 28 may or may not be mechanically connected to the printed circuit board 12. In the implementation shown in FIG. 1, the waveguide component 28 can be mechanically connected directly to the printed circuit board 12. In some implementations, further components can be arranged between the waveguide component 28 and the printed circuit board 12, e.g., an indirect mechanical connection can be present. By way of example, a mechanical connection between the waveguide component 28 and the printed circuit board 12 can be provided using one or more from an adhesive, a solder material, a clamp, a clip, a screw, etc. In this case, the waveguide component 28 can extend over the top side and side surfaces of the RF package 2 or of the substrate 4 and thereby at least partly cover or encapsulate the RF package 2.

Each of the RF radiation elements 16 can be configured to feed or radiate RF signals generated by the RF chip 14 and guided to the RF radiation element 16 into the corresponding waveguide 30. Alternatively or additionally, the RF radiation element 16 can be configured to receive RF signals radiated into the corresponding waveguide 30 from outside the RF device 100, which signals can then be forwarded to the RF chip 14. In the context described, the RF radiation element 16 can also be referred to as a "waveguide feed". An electrical connection between the RF radiation element 16 and the RF chip 14 can be provided for example by a coaxial connection extending substantially vertically.

The RF radiation element 16 can be embodied for example as an antenna in the form of a structured metal layer on the upper surface 8 of the substrate 4. In this case, such an antenna need not necessarily emit uniformly into the space, but rather can be configured to feed the electromagnetic waves generated by it into the corresponding waveguide 30 in a suitable manner. One example implementation of such an antenna structure is shown and described in FIG. 24. The respective RF radiation element 16 can be arranged on the upper surface 8 such that the RF radiation element 16 and the volume of the waveguide 30 arranged thereover at least partly overlap in an orthogonal projection onto the upper surface 8 of the substrate 4.

The waveguide component 28 can be embodied integrally or comprise a multiplicity of parts. The waveguide component 28 can be fabricated from plastic, a ceramic material, and/or a dielectric material. In the implementation shown in FIG. 1, the waveguides 30 can be embodied in the form of hollow waveguides having metallized inner walls. In this case, it is possible for the hollow waveguides to be air- or gas-filled, e.g., not to contain any solid or any liquid. In other words, one or more of the waveguides 30 can be "material-free" hollow waveguides. Such hollow waveguides can be embodied for example as WR (Waveguide Rectangular) hollow waveguides, for example as WR10 or WR12 hollow waveguides. In some implementations, the waveguides of RF devices in accordance with the disclosure can alternatively or additionally be embodied in the form of dielectric waveguides or hollow substrate integrated waveguides (SIWs).

The waveguide component 28 can be embodied in particular in a monolayered or multilayered injection-molded plastic assembly. The at least one waveguide 30 can comprise a metallized hollow waveguide embodied in the injection-molded plastic assembly. The waveguide component 28 can comprise any desired combination of interconnected hollow waveguide sections, which can extend in particular horizontally and/or vertically. One example implementation of a horizontal hollow waveguide in a multilayered injection-molded plastic assembly is shown and described in FIG. 25.

In the implementation shown in FIG. 1 and the further RF devices in accordance with the disclosure as described herein, the waveguide component 28 or its waveguides 30 can be arranged, for example, over the main top side of the RF package 2. In some implementations, the waveguides 30 of the waveguide component 28 can alternatively or additionally be arranged over one or more side surfaces of the RF package 2. The RF radiation elements of the respective RF device can then correspondingly also be configured to radiate at the side or laterally into waveguides 30 of the waveguide component 28.

A gap 32 can be arranged between the top side of the RF package 2 and the underside of the waveguide component 28. The gap 32 can have a width b in a range of approximately 100 micrometers to approximately 250 micrometers, or of approximately 100 micrometers to approximately 225 micrometers, or of approximately 100 micrometers to approximately 200 micrometers, in a direction perpendicular to the top side of the RF package 2, e.g., in the z-direction. A shielding structure 34 can be arranged in the gap 32. In the implementation shown in FIG. 1, the shielding structure 34 can comprise an electrically conductive layer 36 having one or more openings 38. In this case, the openings 38 can each be aligned with one of the RF radiation elements 16. The shielding structure 34 or the conductive layer 36 can comprise spring structures 40 surrounding the openings 38. The spring structures 40 can be fabricated from an electrically conductive material. Example implementations of shielding structures having spring structures are shown and described in FIGS. 2A to 9.

On account of the mechanical connections between the waveguide component 28 and the printed circuit board 12, between the waveguide component 28 and the RF package 2, and between the RF package 2 and the printed circuit board 12, mechanical stresses can occur during production and/or operation of the RF device 100. In some cases, the mechanical stresses can result in mechanical loading of the first connection elements 10 and in the worst case can result in the connection elements breaking. In order to avoid these mechanical stresses, the shielding structure 34 can permit a relative movement between the RF package 2 and the waveguide component 28 in a direction perpendicular to the top side of the RF package 2, e.g., in the z-direction. The spring structures 40 can form a mechanical buffer between the RF package 2 and the waveguide component 28. This makes it possible to provide mechanical stress reduction on the top side of the RF package 2.

The spring structures 40 can project from the electrically conductive layer 36 in the z-direction and bridge the gap 32. In this case, the gap 32 can be bridged substantially completely by the spring structures 40. As a result, the shielding structure 34 or the spring structures 40 can form a waveguide, which can be configured to transfer the transmission signals and/or the reception signals between the RF radiation elements 16 and the waveguides 30 of the waveguide component 28. In this case, the transmission signals and/or reception signals can be shielded in such a way that a propagation of the signals via the gap 32, e.g., in the x-y-plane, can be attenuated or prevented. As a result, crosstalk of RF signals transferred in adjacent waveguides 30 can be prevented or at least reduced. In accordance with the statements above, the shielding structure 34 can thus fulfil a dual function. Firstly, the shielding structure 34 can provide a mechanical buffer between the RF package 2 and the waveguide component 28. Secondly, the shielding structure 34 can attenuate a propagation of RF signals via the gap 32.

Figure 2A:
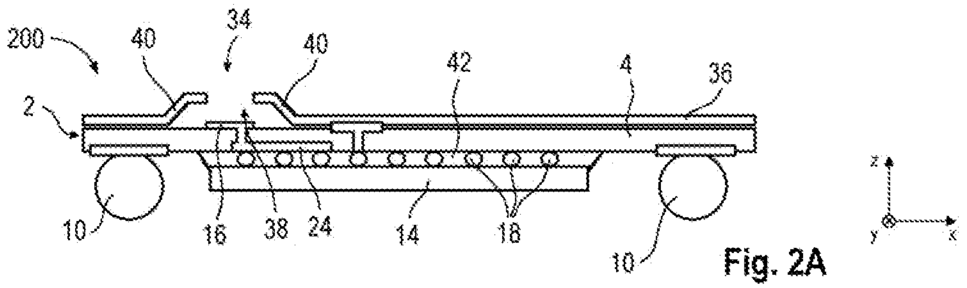
FIGS. 2A and 2B schematically show a cross-sectional side view and a plan view of an RF device 200 in accordance with the disclosure.
Figure 2B:
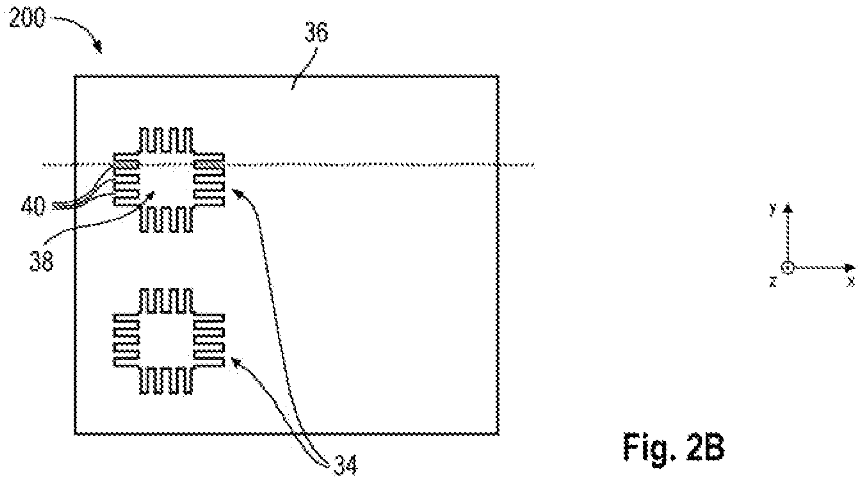

FIGS. 2A and 2B schematically show a cross-sectional side view and a plan view of an RF device 200 in accordance with the disclosure. In this case, the cross-sectional side view in FIG. 2A can emerge from a sectional plane indicated by a dashed line in the plan view in FIG. 2B. The RF device 200 can have some or all of the features of the RF device 100 from FIG. 1. The example implementation shown in FIG. 2 need not necessarily illustrate all of the components of the RF device 200. By way of example, FIG. 2 does not show a printed circuit board and a waveguide component such as have been described in association with FIG. 1.

The RF device 200 can comprise an RF package 2. In some implementations, an RF chip 14 of the RF package 2 in FIG. 2 need not necessarily be encapsulated by an encapsulation material. The RF chip 14 can thus be a "bare die", e.g., an unpackaged semiconductor chip. The RF device 200 can optionally comprise an underfill material 42, which can be arranged between the RF chip 14 and the substrate 4. By way of example, the underfill material 42 can comprise one or more from an epoxy resin, a polymer, or a plastic. The underfill material 42 can be configured to provide a mechanical stabilization between the RF chip 14 and the substrate 4. Furthermore, the underfill material 42 can be configured to reduce thermomechanical stresses that can result from different coefficients of thermal expansion of the RF chip 14 and of the substrate 4.

For the sake of simplicity, only one shielding structure 34 of the RF device 200 is shown in the side view in FIG. 2A. The spring structures 40 of the shielding structure 34 can each project from the electrically conductive layer 36 in the z-direction. The spring structures 40 arranged next to the opening 38 on the left and right can each have a substantially S-shaped configuration. In this case, the upper ends of the S-shaped spring structures 40 can point in opposite directions. In the implementation shown in FIG. 2A, the upper end of the left spring structure 40 can point toward the right, while the upper end of the right spring structure 40 can point toward the left. The top sides of the spring structures 40 can substantially be arranged in a common plane and provide a bearing surface for a waveguide component (not shown). The S-shaped spring structures 40 can be elastic, for example, in the z-direction, and provide the function of a mechanical buffer in this direction.

In the plan view in FIG. 2B, the opening 38 can have a substantially square shape. In some implementations, the shape of the opening 38 can be embodied differently, for example rectangular, circular, elliptical, polygonal, etc. The spring structures 40 can jointly form a meandering configuration and surround the opening 38. In the implementation shown in FIG. 2B, four slots can be formed at each side of the opening 38. As a result, three spring structures 40 can be provided at each side of the opening 38, which spring structures can extend substantially parallel to one another.

In the implementation shown in FIG. 2, the electrically conductive layer 36 and the spring structures 40 can be embodied integrally or in one piece. A mechanical connection between the electrically conductive layer 36 and the substrate 4 can be provided, for example, by an adhesive and/or a solder material. In some implementations, the electrically conductive layer 36 and the spring structures 40 can be formed from a leadframe. The leadframe can be fabricated for example from a metal and/or a metal alloy. In some implementations, the leadframe can be fabricated from copper and/or a copper alloy. A dimension of the leadframe in the z-direction can have a value of up to approximately 100 micrometers, or up to approximately 150 micrometers, or up to approximately 200 micrometers. The openings 38 and the spring structures 40 can be formed by structuring of the leadframe, for example by one or more from stamping, etching, bending, etc. In some implementations, the electrically conductive layer 36 and the spring structures 40 can be formed from a metallized plastic plate.

Figure 3:
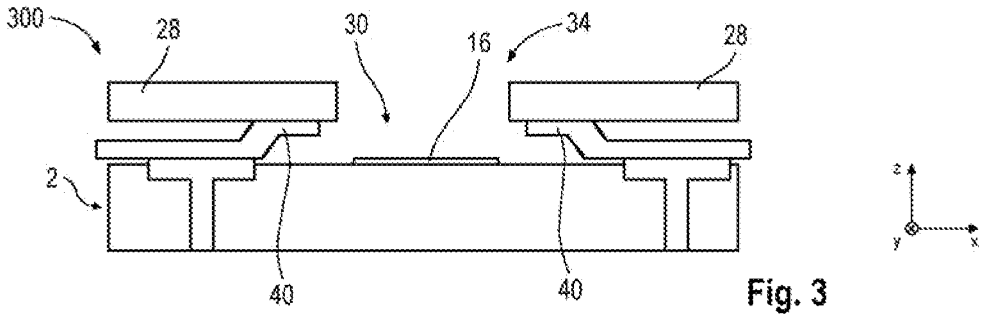
FIG. 3 schematically shows a cross-sectional side view of an RF device 300 in accordance with the disclosure.

FIG. 3 schematically shows a cross-sectional side view of an RF device 300 in accordance with the disclosure. The RF device 300 can have some or all of the features of the RF device 200 from FIG. 2. Relative to FIG. 2, FIG. 3 additionally shows a part of a waveguide component 28 having a waveguide 30, into which the RF radiation element 16 can radiate transmission signals and/or via which the RF radiation element 16 can receive reception signals. The undersides of the waveguide component 28 can bear on the top sides of the spring structures 40. In this case, the top sides of the spring structures 40 and the undersides of the waveguide component 28 can be arranged in a common plane.

Figure 4A:
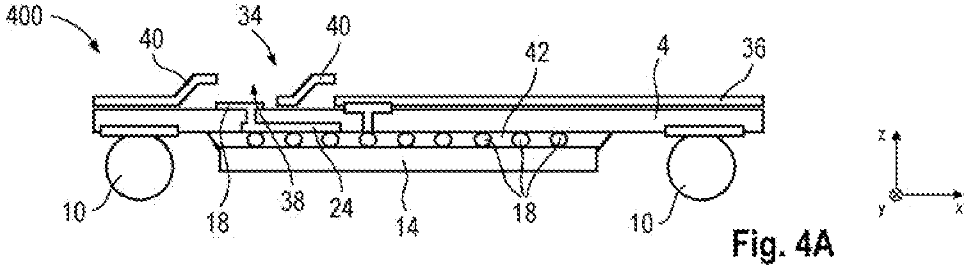
FIGS. 4A and 4B schematically show a cross-sectional side view and a plan view of an RF device 400 in accordance with the disclosure.
Figure 4B:
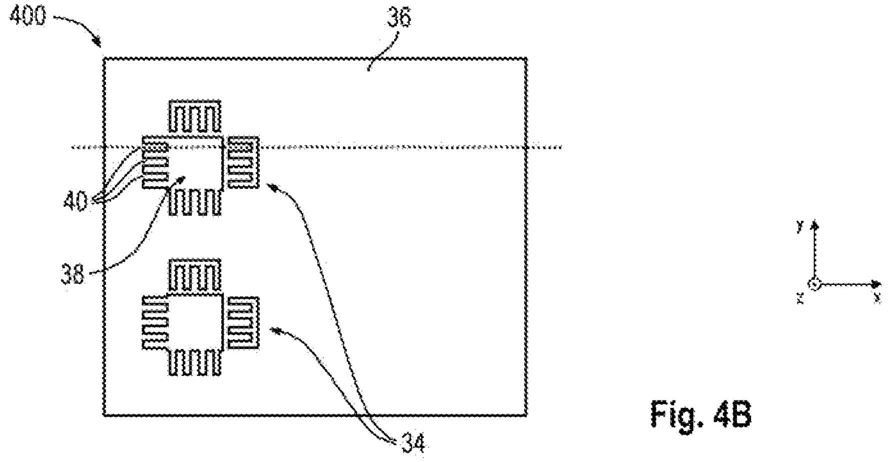

FIGS. 4A and 4B schematically show a cross-sectional side view and a plan view of an RF device 400 in accordance with the disclosure. The RF device 400 can have some or all of the features of the RF device 200 from FIG. 2. Compared with FIG. 2, the spring structures 40 arranged next to the opening 38 on the right in FIG. 4 can point in a different direction. That can mean that in FIG. 4 the upper ends of the spring structures 40 arranged next to the opening 38 on the left and right can point in identical directions. In the implementation shown in FIG. 2A, both the upper end of the left spring structure 40 and the upper end of the right spring structure 40 can point toward the right.

Figure 5:
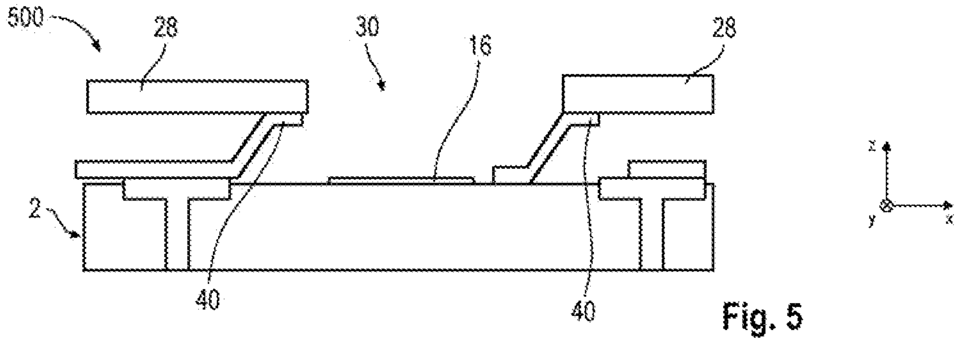
FIG. 5 schematically shows a cross-sectional side view of an RF device 500 in accordance with the disclosure.

FIG. 5 schematically shows a cross-sectional side view of an RF device 500 in accordance with the disclosure. The RF device 500 can have some or all of the features of the RF device 400 from FIG. 4. Relative to FIG. 4, FIG. 5 additionally shows a part of a waveguide component 28 having a waveguide 30, into which the RF radiation element 16 can radiate transmission signals and/or via which the RF radiation element 16 can receive reception signals. The undersides of the waveguide component 28 can bear on the top sides of the spring structures 40. In this case, the top sides of the spring structures 40 and the undersides of the waveguide component 28 can be arranged in a common plane.

Figure 6:
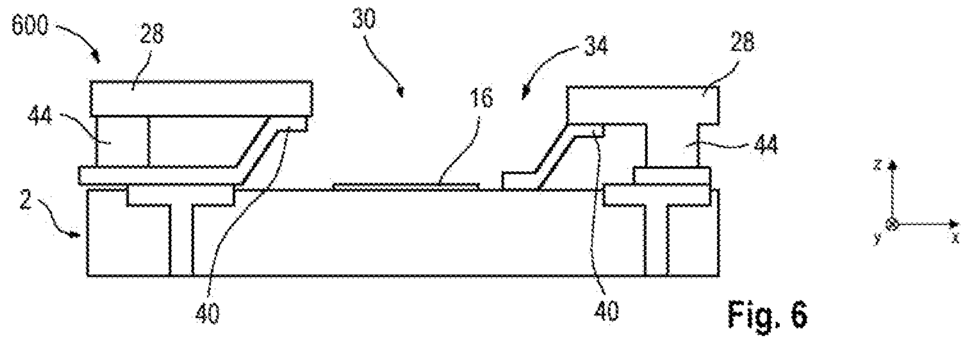
FIG. 6 schematically shows a cross-sectional side view of an RF device 600 in accordance with the disclosure.

FIG. 6 schematically shows a cross-sectional side view of an RF device 600 in accordance with the disclosure. The RF device 600 can have some or all of the features of the RF device 500 from FIG. 5. Relative to FIG. 5, the RF device 600 in FIG. 6 can comprise one or more spacers 44, which can be arranged between the RF package 2 and the waveguide component 28. The spacers 44 can be fabricated from an arbitrary rigid material and provide a minimum spacing between the top side of the RF package 2 and the underside of the waveguide component 28. Overbending and/or damage of the spring structures 40 can be avoided as a result. FIG. 6 shows two spacers 44 by way of example. The right spacer 44 can be arranged on the underside of the waveguide component 28 and can be embodied integrally with the latter and from the same material. The left spacer 44 can be a component which is separate from the RF package 2 and the waveguide component 28 and which may or may not be embodied from the same material. In the example side view in FIG. 6, the spacers 44 can have a substantially square shape. In some implementations, a side view of the spacers 44 can have a different configuration, for example rectangular, circular, elliptical, polygonal, etc.

Figure 7A:
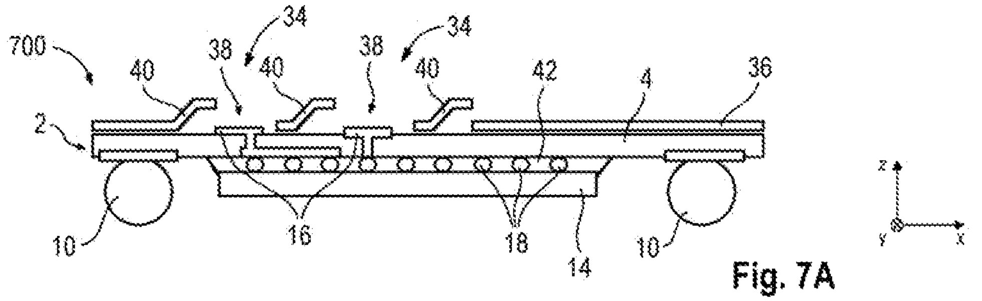
FIGS. 7A and 7B schematically show a cross-sectional side view and a plan view of an RF device 700 in accordance with the disclosure.
Figure 7B:
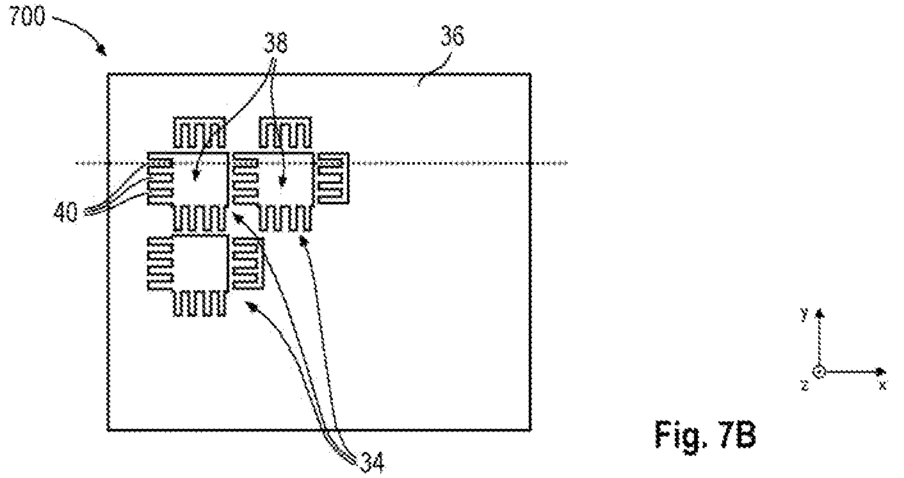

FIGS. 7A and 7B schematically show a cross-sectional side view and a plan view of an RF device 700 in accordance with the disclosure. The RF device 700 can have some or all of the features of the RF device 200 from FIG. 2. Relative to FIG. 2A, the RF device 700 in the side view in FIG. 7A can comprise a further RF radiation element 16 and a further opening 38 arranged thereover. In this case, the spring structure 40 arranged between the two openings 38 can delimit both the left opening 38 and the right opening 38. In other words, in the example in FIG. 7, the shielding structures 34 associated with adjacent RF radiation elements 16 can comprise common spring structures 40.

Figure 8A:
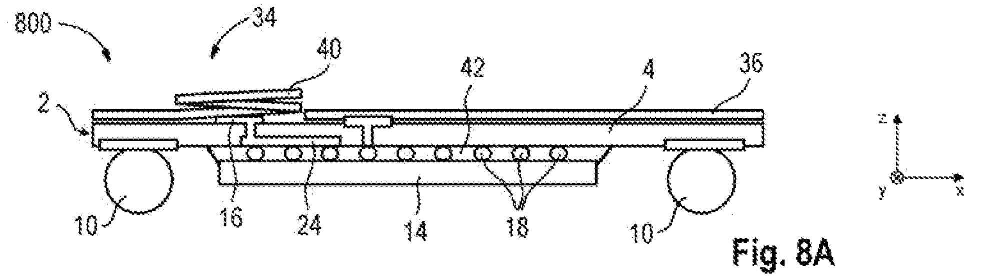
FIGS. 8A and 8B schematically show a cross-sectional side view and a plan view of an RF device 800 in accordance with the disclosure.
Figure 8B:
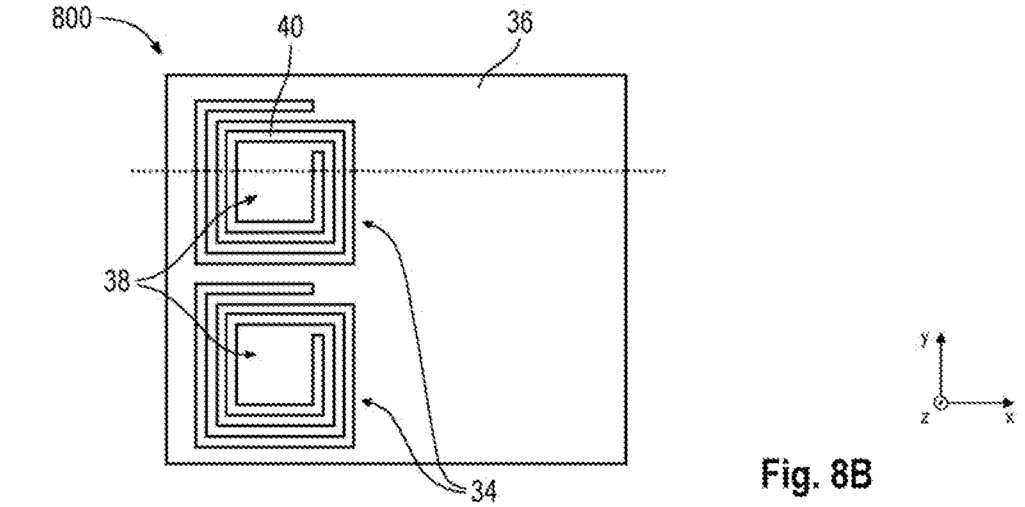

FIGS. 8A and 8B schematically show a cross-sectional side view and a plan view of an RF device 800 in accordance with the disclosure. The RF device 800 can have some or all of the features of the RF device 200 from FIG. 2. Relative to FIGS. 2A and 2B, the spring structures 40 in FIG. 8 can be embodied in spiral fashion. In the plan view in FIG. 8B, the turns of the spiral spring structure 40 can have an angular and substantially square course, for example. In some implementations, the turns can have a different course, for example rectangular, circular, elliptical, polygonal, etc. In the implementation shown in FIG. 8, the spring structures 40 can each have approximately two turns. In some implementations, the number of turns can deviate therefrom and can depend on the dimension of a gap between the RF package 2 and a waveguide component (not shown) arranged thereover.

Figure 9:
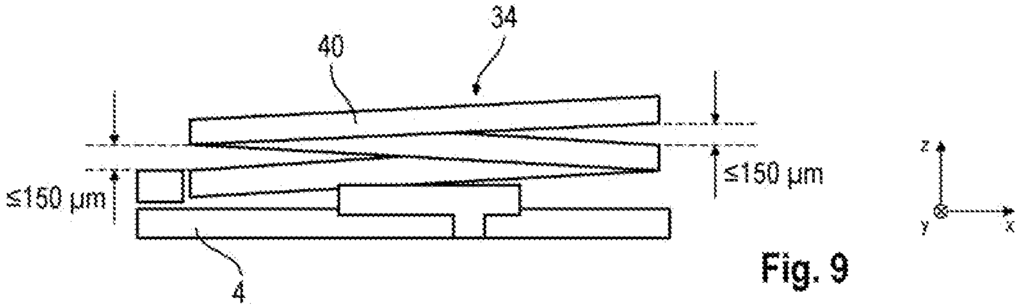
FIG. 9 schematically shows a cross-sectional side view of an RF device 900 in accordance with the disclosure.

FIG. 9 schematically shows a cross-sectional side view of an RF device 900 in accordance with the disclosure. The RF device 900 can have for example some or all of the features of the RF device 800 from FIG. 8. FIG. 9 illustrates dimensions of spiral spring structures 40 such as have been described in association with FIG. 8. A distance between turns of the spiral spring structure 40 that lie one above another can be less than approximately 150 micrometers, or less than approximately 125 micrometers, or less than approximately 100 micrometers, or less than approximately 75 micrometers.

Further RF devices in accordance with the disclosure having shielding structures are described below. In this case, the shielding structures can each be embodied differently than the shielding structures described in association with the preceding examples. However, all of the shielding structures described herein can have identical functionalities. In some implementations, each of the shielding structures described herein can provide the dual function of a mechanical buffer and a signal shield as already described in association with FIG. 1.

Figure 10:
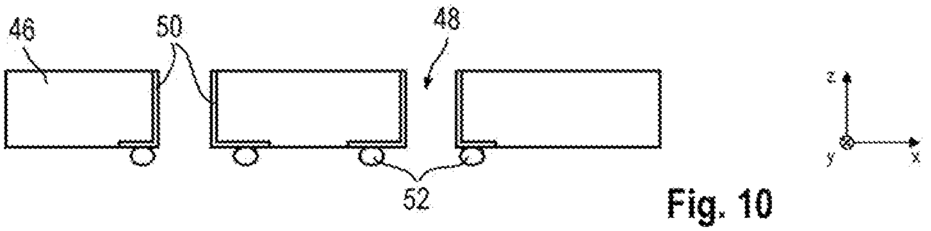
FIG. 10 schematically shows a cross-sectional side view of an interposer such as can be contained in an RF device in accordance with the disclosure.

FIG. 10 schematically shows a cross-sectional side view of an interposer (or intermediate element) 46 such as can be contained in an RF device in accordance with the disclosure. The interposer 46 can comprise at least one from a semiconductor material, a glass material, a laminate, a mold compound or a metal film. One or more through holes 48 can be formed in the interposer 46. The through holes 48 can extend completely from the underside of the interposer 46 to the top side of the interposer 46. As will be evident later from FIG. 12, the number of through holes 48 can correspond to a number of RF radiation elements of an associated RF package.

The inner walls of the through holes 48 can be at least partly covered by an electrically conductive material 50. In some implementations, the inner walls can be completely covered by the electrically conductive material 50. In some implementations, the electrically conductive material 50 can only partly cover the inner walls. In this case, the electrically conductive material 50 can have an arbitrary geometric shape, for example strip-shaped, lattice-shaped, punctiform, etc. One or more electrical connection elements 52 can be arranged on the underside of the interposer 46, and can be configured to mechanically and electrically couple the interposer 46 to another component (not shown). In FIG. 10, the connection elements 52 can be embodied as solder balls or solder deposits, for example.

Figure 11:
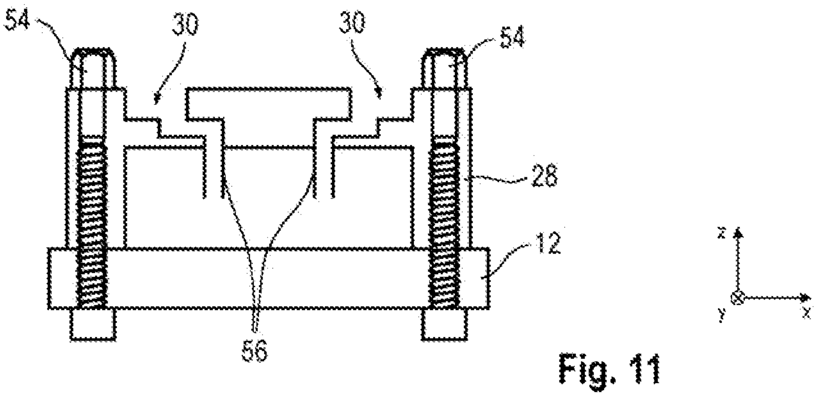
FIG. 11 schematically shows a cross-sectional side view of a waveguide component such as can be contained in an RF device in accordance with the disclosure.

FIG. 11 schematically shows a cross-sectional side view of a waveguide component 28 such as can be contained in an RF device in accordance with the disclosure. The waveguide component 28 can be mechanically connected directly to a printed circuit board 12 using one or more mechanical connection elements 54. In the implementation shown in FIG. 1, the mechanical connection elements 54 can be screws. Alternatively or additionally, in some implementations, a mechanical connection can be provided using one or more from an adhesive, a solder material, a clamp, a clip, etc. For the sake of simplicity and for pictorial reasons, an RF package arranged between the printed circuit board 12 and the waveguide component 28 is not shown in FIG. 11.

The waveguide component 28 can have one or more plug structures 56 on its underside. Two plug structures 56 are shown by way of example in FIG. 11. In some implementations, the number of plug structures can deviate therefrom. As will be evident later from FIG. 12, the number of plug structures 56 can correspond to a number of RF radiation elements of an associated RF package. In the implementations shown in FIG. 11, the plug structures 56 and the waveguide component 28 can be fabricated integrally and from the same material. In some implementations, the plug structures 56 can be components separate from the waveguide component 28 and/or can be fabricated from a different material. The plug structures 56 can be hollow. The inner walls of the hollow plug structures 56 can be at least partly covered by an electrically conductive material (not shown).

In some implementations, the inner walls can be completely covered by the electrically conductive material. In some implementations, the electrically conductive material can only partly cover the inner walls. In this case, the electrically conductive material can have an arbitrary geometric shape, for example strip-shaped, lattice-shaped, punctiform, etc. On account of the hollow structure and the conductive inner walls, the plug structures 56 can form hollow waveguides.

Figure 12:
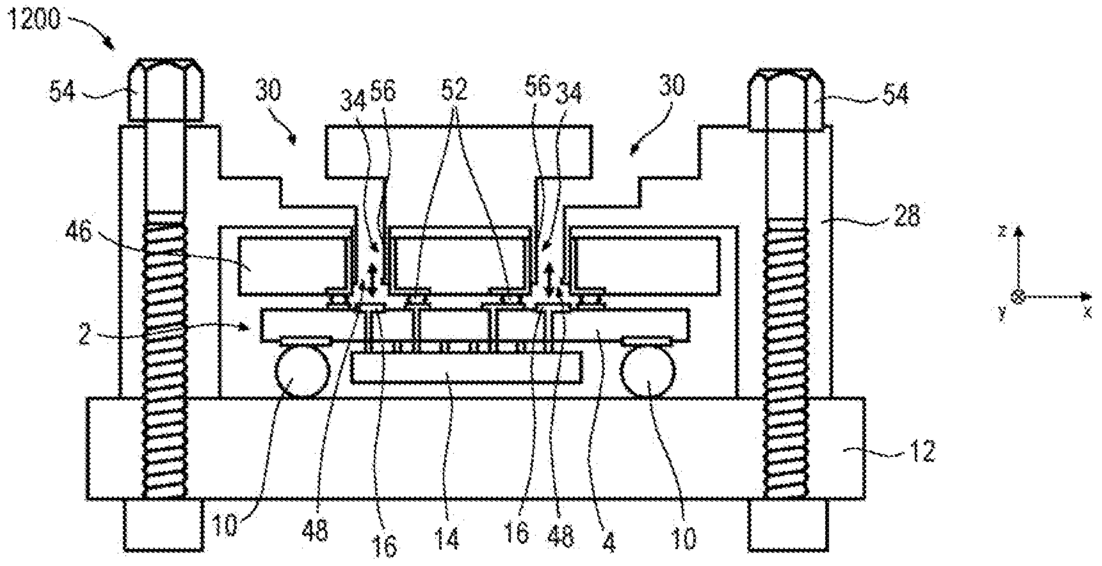
FIG. 12 schematically shows a cross-sectional side view of an RF device 1200 in accordance with the disclosure.

FIG. 12 schematically shows a cross-sectional side view of an RF device 1200 in accordance with the disclosure. The RF device 1200 can have some or all of the features of the RF device 100 from FIG. 1. Relative to FIG. 1, the RF package 2 in FIG. 12 can be a different type of package. The RF chip 14 of the RF device 1200 need not necessarily be encapsulated by an encapsulation material as shown in FIG. 1. The RF package 2 in FIG. 12 can be for example a flip-chip chip scale package (FCCSP).

The RF device 1200 can comprise the interposer 46 from FIG. 10 and the waveguide component 28 from FIG. 11. The interposer 46 can be arranged between the RF package 2 and the waveguide component 28. In this case, the electrical connection elements 52 on the underside of the interposer 46 can be connected to conductive structures arranged on the top side of the RF package 2. The through holes 48 of the interposer 46 can be aligned with the RF radiation elements 16 of the RF package 2. Furthermore, the plug structures 56 arranged on the underside of the waveguide component 28 can be plugged into the through holes 48 of the interposer 46. In this case, the plug structures 56 can at least partly bridge the upper gap between the top side of the interposer 46 and the underside of the waveguide component 28. In an analogous manner, the electrical connection elements 52 can at least partly bridge the lower gap between the top side of the RF package 2 and the underside of the interposer 46.

The RF device 1200 can comprise one or more shielding structures 34, which can comprise at least one from the plug structure 56, the metallized through holes 48 of the interposer 46 and the electrical connection elements 52. The shielding structures 34 can have the properties of hollow waveguides and shield signals transferred between the RF radiation elements 16 and the waveguides 30 of the waveguide component 28 in such a way that a propagation of the signals via the gaps described can be attenuated or prevented. Furthermore, the plug structures 56 plugged into the through holes 48 of the interposer 46 can permit a relative movement between the RF package 2 and the waveguide component 28 in the z-direction. The possibility of such a movement is indicated by small vertical arrows in FIG. 12.

Figure 13:
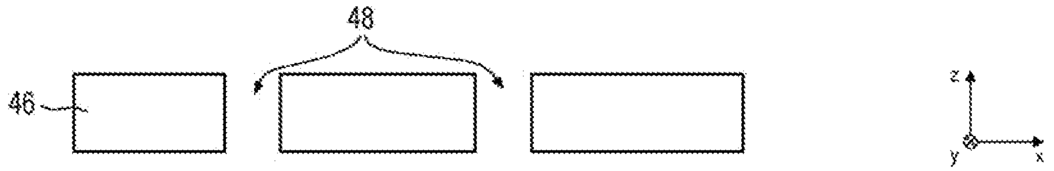
FIG. 13 schematically shows a cross-sectional side view of an interposer such as can be contained in an RF device in accordance with the disclosure.

FIG. 13 schematically shows a cross-sectional side view of an interposer 46 such as can be contained in an RF device in accordance with the disclosure. The interposer 46 can have one or more features of the interposer 46 from FIG. 10. In some implementations, the interposer 46 in FIG. 13 can be fabricated from at least one from a metal, a metal alloy or an electrically conductive polymer. The through holes 48 can be produced by any suitable process, for example by an etching process.

Figure 14:
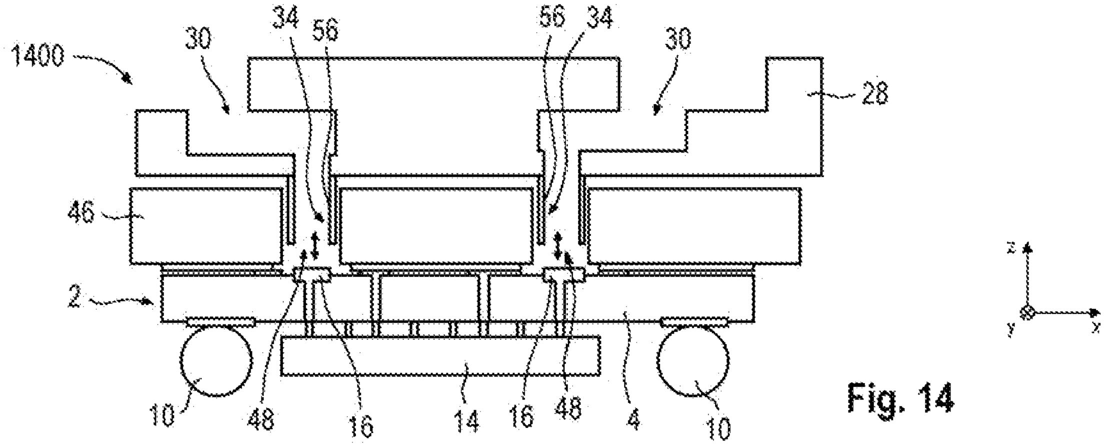
FIG. 14 schematically shows a cross-sectional side view of an RF device 1400 in accordance with the disclosure.

FIG. 14 schematically shows a cross-sectional side view of an RF device 1400 in accordance with the disclosure. The RF device 1400 can have some or all of the features of the RF device 1200 from FIG. 12. The RF device 1400 can comprise for example the interposer 46 from FIG. 13 and the waveguide component 28 from FIG. 11. For the sake of simplicity, a printed circuit board on which the RF package 2 can be mounted is not shown in FIG. 14. Analogously to FIG. 12, the interposer 46 can be arranged between the RF package 2 and the waveguide component 28. In this case, the underside of the interposer 46 can be mechanically connected to the top side of the RF package 2. This connection can be provided, for example, based on an electrically conductive adhesive, a soldering process and/or a direct bonding process. The plug structures 56 arranged at the underside of the waveguide component 28 can be plugged into the through holes 48 of the interposer 46.

Figure 15:
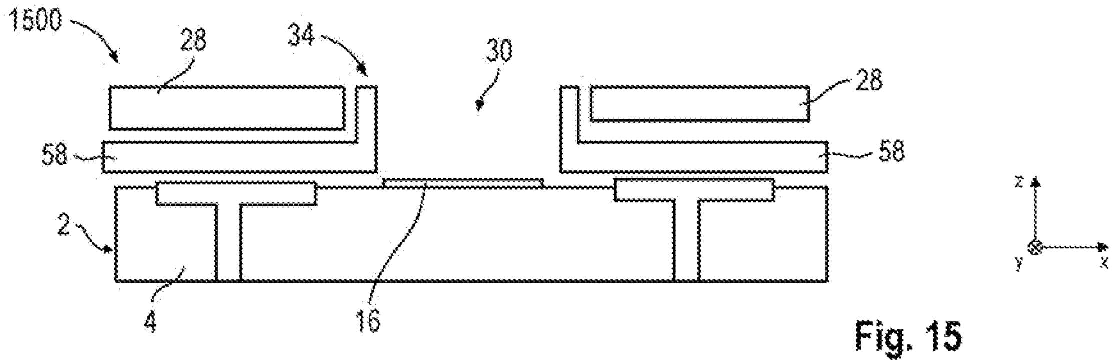
FIG. 15 schematically shows a cross-sectional side view of an RF device 1500 in accordance with the disclosure.

FIG. 15 schematically shows a cross-sectional side view of an RF device 1500 in accordance with the disclosure. The RF device 1500 can have some or all of the features of RF devices described above. For the sake of simplicity, FIG. 15 does not illustrate all of the components of the RF device 1500. By way of example, an RF chip of the RF device or a printed circuit board on which the RF device 1500 can be mounted is not shown. Furthermore, some components of the RF device 1500 are only partly illustrated. By way of example, only a part of a waveguide component 28 of the RF device 1500 can be seen.

Analogously to RF devices described above, the RF device 1500 in FIG. 15 can likewise comprise a shielding structure 34. The shielding structure 34 can comprise a metal layer 58 arranged between the RF package 2 and the waveguide component 28, which metal layer can have sections projecting into the waveguide 30 of the waveguide component 28. In the implementation shown in FIG. 15, the metal layer 58 can be arranged substantially in the x-y-plane. The sections projecting into the waveguide 30 can project from the x-y-plane and extend substantially in the z-direction. The perpendicularly extending sections of the metal layer 58 can form a hollow waveguide and shield signals transferred between the RF radiation element 16 and the waveguide 30 of the waveguide component 28, such that the signals cannot propagate in the x-y-plane.

Figure 16:
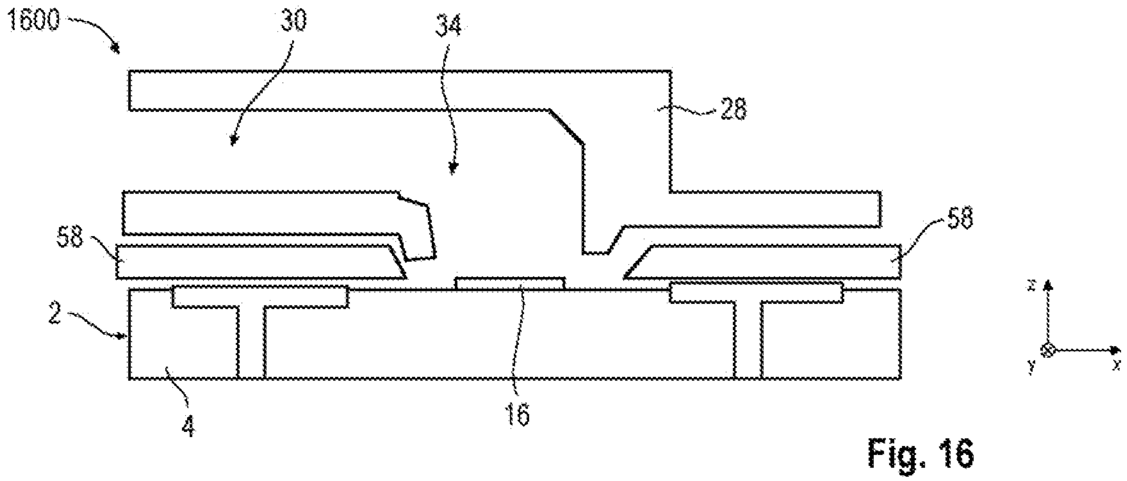
FIG. 16 schematically shows a cross-sectional side view of an RF device 1600 in accordance with the disclosure.

FIG. 16 schematically shows a cross-sectional side view of an RF device 1600 in accordance with the disclosure. The RF device 1600 can have some or all of the features of the RF device 1500 from FIG. 15. The shielding structure 34 in FIG. 16 can comprise a metal layer 58 arranged between the RF package 2 and the waveguide component 28 and having an opening. In this case, the opening can be aligned with the RF radiation element 16. The waveguide component 28 can have sections arranged on its underside and projecting into the opening of the metal layer 58. In this case, the inner surfaces of the sections can be at least partly covered by an electrically conductive material. The waveguide 30 of the waveguide component 28 can thus be continued by the sections into the metal layer 58 and can prevent or at least attenuate a propagation of transmission and reception signals in the x-y-plane.

Figure 17:
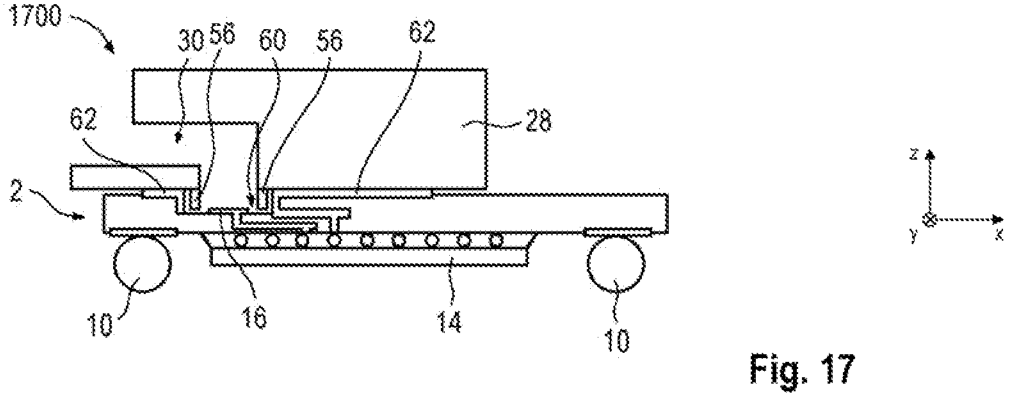
FIG. 17 schematically shows a cross-sectional side view of an RF device 1700 in accordance with the disclosure.

FIG. 17 schematically shows a cross-sectional side view of an RF device 1700 in accordance with the disclosure. The RF device 1700 can have some or all of the features of RF devices described above. The RF package 2 of the RF device 1700 can have a cutout 60 on its top side. A plug structure 56 arranged on the underside of the waveguide component 28 can be plugged into the cutout 60 or project into the cutout 60 and thereby bridge a gap between the RF package 2 and the waveguide component 28. Furthermore, the RF package 2 can have an electrically conductive layer 62 on its top side and on inner walls of the cutout 60. The electrically conductive layer 62 can be at a defined electrical potential, for example at a ground potential.

Figure 18:
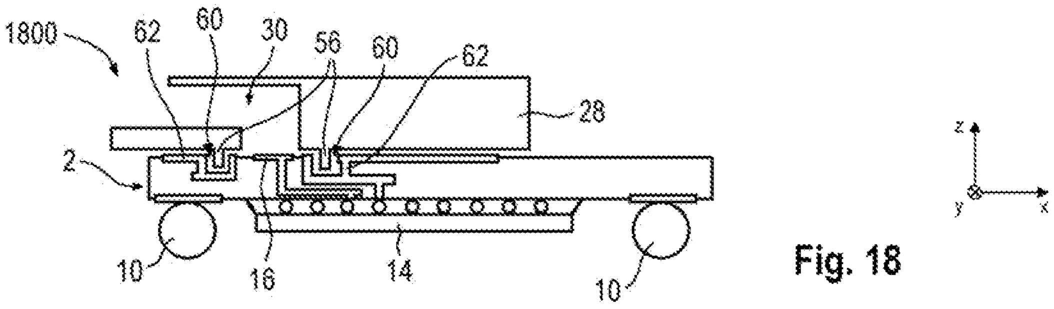
FIG. 18 schematically shows a cross-sectional side view of an RF device 1800 in accordance with the disclosure.

FIG. 18 schematically shows a cross-sectional side view of an RF device 1800 in accordance with the disclosure. The RF device 1800 can have for example some or all of the features of the RF device 1700 from FIG. 17. Analogously to FIG. 17, the RF device 1800 in FIG. 18 can have one (or more) cutouts 60. The inner walls of the cutout 60 can be at least partly covered by an electrically conductive material. In some implementations, the cutout 60, as viewed in the z-direction, can have the configuration of a closed curve around the RF radiation element 16. The course of the curve can be for example circular, elliptical, rectangular, square, polygonal, etc. A plug structure 56 arranged on the underside of the waveguide component 28 can project into the cutout 60 and bridge the gap between the top side of the RF package 2 and the underside of the waveguide component 28.

Figure 19:
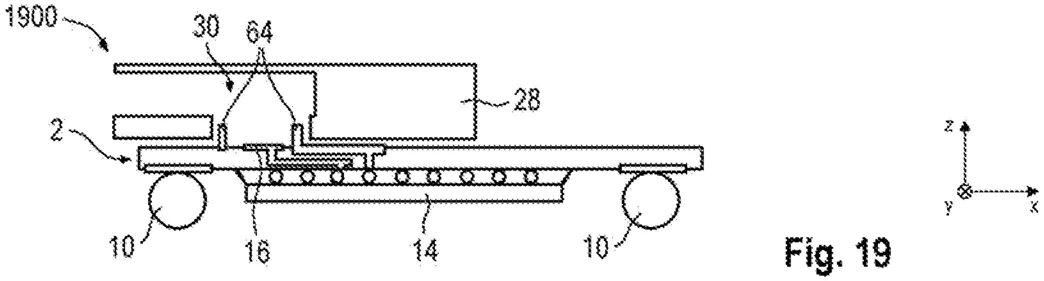
FIG. 19 schematically shows a cross-sectional side view of an RF device 1900 in accordance with the disclosure.

FIG. 19 schematically shows a cross-sectional side view of an RF device 1900 in accordance with the disclosure. The RF device 1900 can have some or all of the features of RF devices described above. In comparison with preceding implementations described above, the shielding structure of the RF device 1900 can be embodied in a different way. The shielding structure can comprise one or more metal columns 64, which can be arranged on the top side of the RF package 2 and around the RF radiation element 16. As viewed in the z-direction, the metal columns 64 can surround the RF radiation element 16, for example, in circular, square, rectangular, elliptical, etc., fashion. In some implementations, the metal columns 64 can also be embodied in continuous fashion, thus resulting in a substantially integral metal column around the RF radiation element 16. By way of example, the metal columns 64 can be fabricated from copper or a copper alloy. The metal columns 64 can bridge the gap between the RF package 2 and the waveguide component 28 and thereby prevent or at least attenuate a propagation of signals into the gap.

Figure 20:
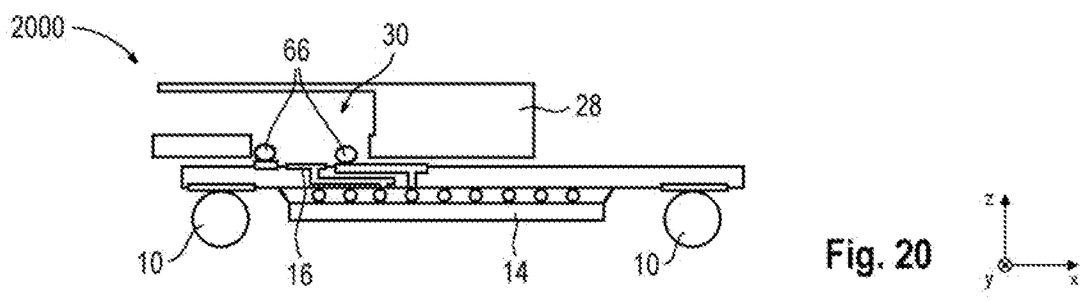
FIG. 20 schematically shows a cross-sectional side view of an RF device 2000 in accordance with the disclosure.

FIG. 20 schematically shows a cross-sectional side view of an RF device 2000 in accordance with the disclosure. The RF device 2000 can have for example some or all of the features of the RF device 1900 from FIG. 19. In some implementations, the RF device 2000 in FIG. 20 can comprise a shielding structure that can be at least partly embodied by solder structures 66 on the top side of the RF package 2. The solder structures 66 in FIG. 20 can have the same functionalities and properties as the metal columns 64 in FIG. 19.

Figure 21:
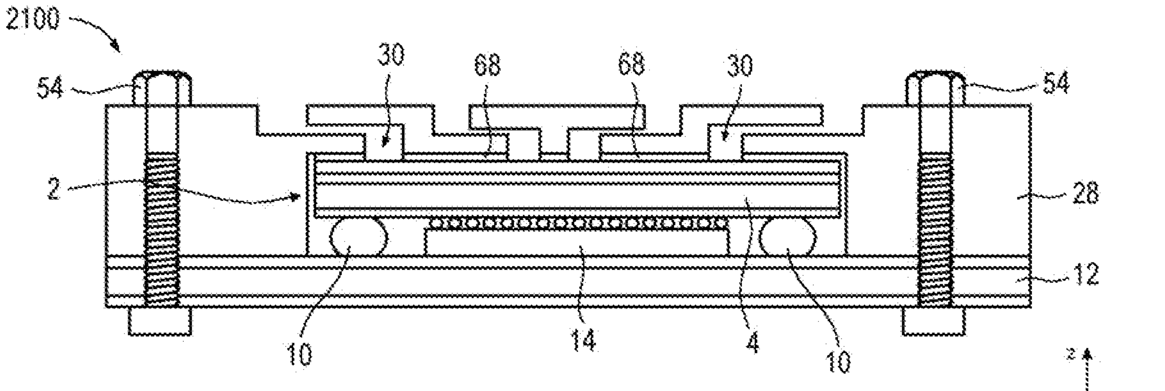
FIG. 21 schematically shows a cross-sectional side view of an RF device 2100 in accordance with the disclosure.

FIG. 21 schematically shows a cross-sectional side view of an RF device 2100 in accordance with the disclosure. The RF device 2100 can have some or all of the features of RF devices described above. In comparison with preceding implementations described above, the shielding structure of the RF device 2100 can be embodied in a different way. In the implementation shown in FIG. 21, the shielding structure can comprise compressible electrically conductive material 68, which can be arranged in the gap between the top side of the RF package 2 and the underside of the waveguide component 28. In this case, the material 68 can contact the top side of the RF package 2 and the underside of the waveguide component 28. Openings arranged in the material 68 can be aligned with RF radiation elements arranged on the top side of the RF package 2 and can shield RF signals transferred between the RF radiation elements and the waveguide 30. The material 68 can be at a ground potential, in particular. A shielding effect of the material 68 can also be achieved, however, if the material 68 is at an arbitrary other electrical potential. The material 68 can be embodied in elastic fashion in any direction. In some implementations, on account of its elasticity in the z-direction, the material 68 can permit a relative movement between the radio-frequency package 2 and the waveguide component 28 in the z-direction.

In some implementations, the material 68 can comprise an electrically conductive foam or can be fabricated from such a foam. Such an electrically conductive foam can comprise for example an NiCu-coated polyolefin foam with conductive adhesive. A surface resistivity of the electrically conductive foam can be less than approximately 0.3 Ω/cm, or less than approximately 0.2 Ω/cm, or less than approximately 0.1 Ω/cm. A volume resistance (resistivity) of the electrically conductive foam can be less than approximately 0.3 Ω/cm, or less than approximately 0.2 Ω/cm, or less than approximately 0.1 Ω/cm. A shielding effect of the electrically conductive foam can be greater than approximately 50 dB, or greater than approximately 60 dB.

Figure 22:
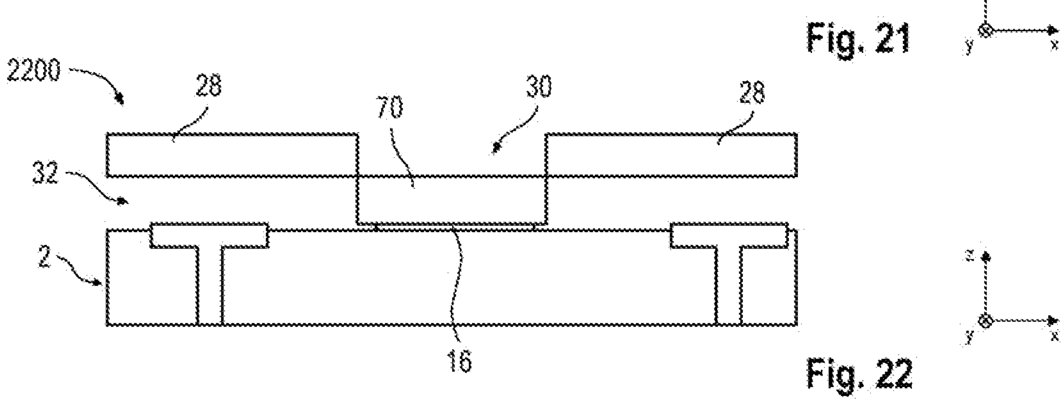
FIG. 22 schematically shows a cross-sectional side view of an RF device 2200 in accordance with the disclosure.

FIG. 22 schematically shows a cross-sectional side view of an RF device 2200 in accordance with the disclosure. The RF device 2200 can have some or all of the features of RF devices described above. In comparison with preceding implementations, the shielding structure of the RF device 2200 can be embodied in a different way. In the implementation shown in FIG. 22, the shielding structure can comprise a dielectric waveguide 70, which can be aligned with the radio-frequency radiation element 16 and can bridge the gap 32. In some implementations, the dielectric waveguide 70 can be fabricated from a polymer. The dielectric waveguide 70 can be configured to focus and guide the signals transferred between the RF radiation element 16 and the waveguide 30 of the waveguide component 28. As a result, a shielding of the signals can be achieved, such that the latter cannot propagate via the gap 32.

Figure 23:
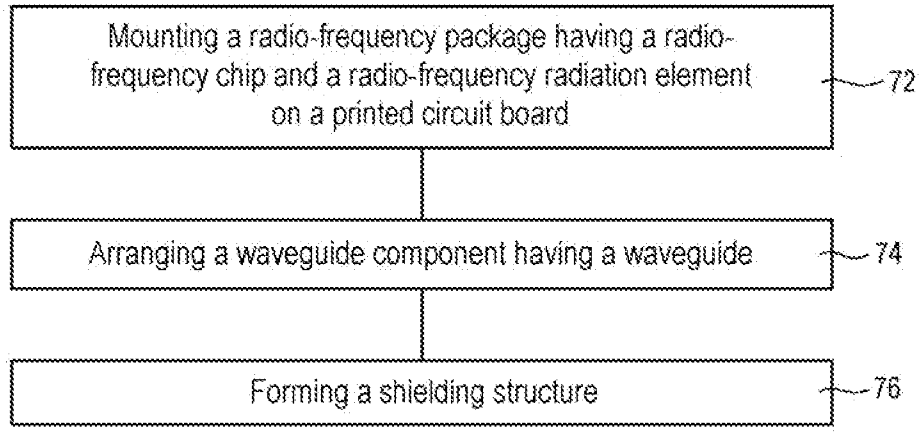
FIG. 23 shows a flow diagram of a method in accordance with the disclosure for producing an RF device.

FIG. 23 shows a flow diagram of a method in accordance with the disclosure for producing an RF device. The method can be used for example to produce one of the RF devices described in the preceding figures and can thus be read in conjunction with the respective figure. The method is presented generally in order to describe aspects of the disclosure qualitatively and can have further aspects. By way of example, the method can be extended by one or more of the aspects described in association with the preceding figures.

At 72, an RF package having an RF chip and an RF radiation element can be mounted on a printed circuit board. At 74, a waveguide component having a waveguide can be arranged, wherein the RF radiation element can be configured to radiate transmission signals into the waveguide and/or to receive reception signals via the waveguide. A gap can be arranged between a first side of the RF package and a second side of the waveguide component. At 76, a shielding structure can be formed. The shielding structure can be configured to permit a relative movement between the RF package and the waveguide component in a first direction perpendicular to the first side of the RF package. Furthermore, the shielding structure can be configured to shield the transmission signals and/or the reception signals in such a way that a propagation of the signals via the gap is attenuated or prevented.

Figure 24:
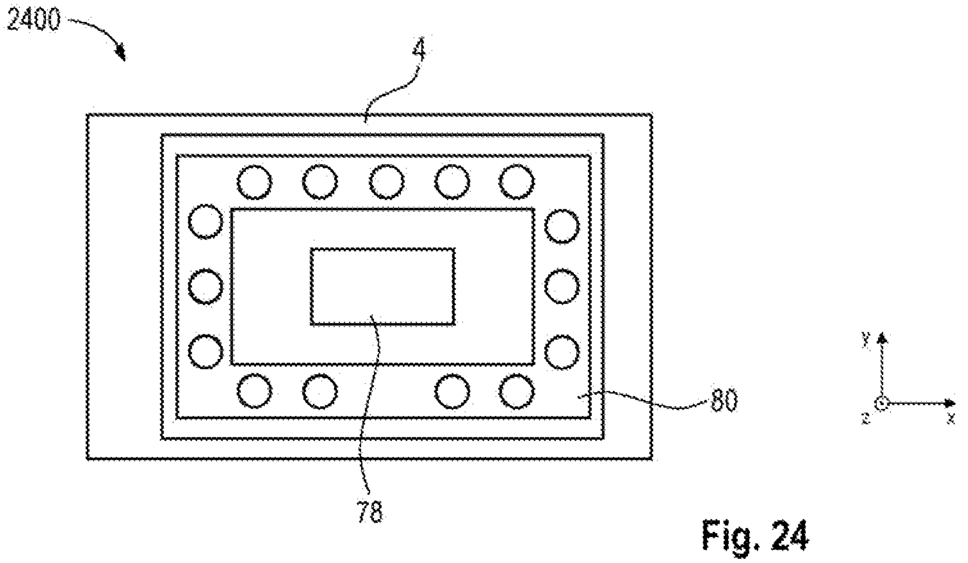
FIG. 24 schematically shows a plan view of an RF radiation element 2400 such as can be contained in an RF device in accordance with the disclosure.

FIG. 24 schematically shows a plan view of a radiation element 2400 such as can be contained in an RF device in accordance with the disclosure. By way of example, one or more of the radiation elements 16 in the figures described above can be embodied in a similar way. As already described in FIG. 1, for example, the radiation element 2400 can be arranged on a substrate 4. The radiation element 2400 can comprise a patch antenna 78, which can be surrounded by a ground structure 80. The patch antenna 78 can be embodied by a rectangular metal area, for example, and the ground structure 80 can extend in a rectangular frame shape around the patch antenna 78. The arrangement shown in FIG. 24 can be configured, for example, to radiate RF signals generated by an RF chip and guided to the radiation element 2400 into a waveguide in a suitable manner.

Figure 25:
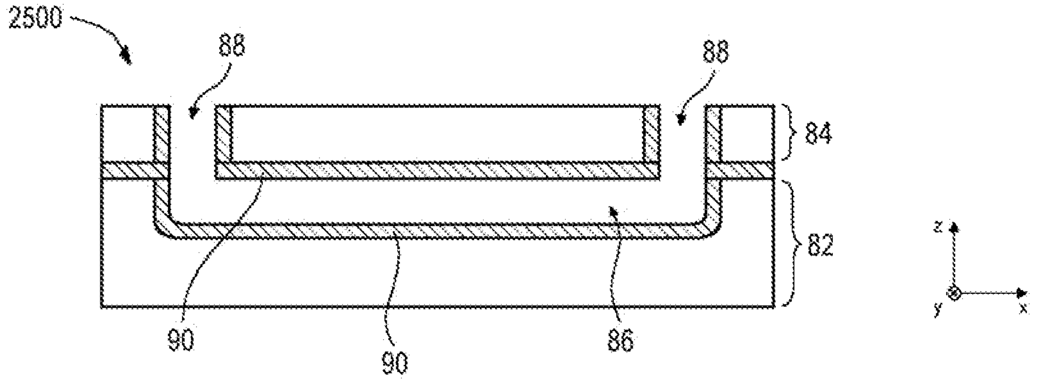
FIG. 25 schematically shows a cross-sectional side view of a multilayered injection-molded plastic assembly 2500 having an integrated hollow waveguide and of the kind such as can be contained in an RF device in accordance with the disclosure.

FIG. 25 schematically shows a cross-sectional side view of a multilayered injection-molded plastic assembly 2500 with an integrated hollow waveguide. By way of example, the waveguide component 28 from the figures described previously can be embodied by a similar injection-molded plastic assembly. The injection-molded plastic assembly 2500 can comprise a first layer arrangement 82 and a second layer arrangement 84. Each of the layer arrangements 82 and 84 can comprise one or more layers, for example layers composed of a ceramic and/or dielectric material. The first layer arrangement 82 can have a horizontally extending cutout 86, while the second layer arrangement 84 can have through holes 88 extending vertically through the second layer arrangement 84. The layer arrangements 82 and 84 can be aligned with one another such that the cutout 86 and the through holes 88 form a channel extending continuously through the layer arrangements 82 and 84. The inner walls of the channel can be covered by a metallization 90 throughout. The channel with its metallized inner walls can thus form a hollow waveguide through the layer arrangements 82 and 84.

FIG. 25 illustrates by way of example a substantially horizontal course of a hollow waveguide through a multi-layered injection-molded plastic assembly 2500. In this case, only a part of the injection-molded plastic assembly 2500 is illustrated. The injection-molded plastic assembly 2500 can comprise an arbitrary number of further layer arrangements which can be structured and arranged one above another such that one or more hollow waveguides having an arbitrary combination of, for example, horizontal and/or vertical sections can extend through the injection-molded plastic assembly 2500. Through a suitable combination of horizontal and/or vertical sections, it is possible to realize an arbitrary course of the hollow waveguide(s) through the injection-molded plastic assembly 2500.

Figure 26:
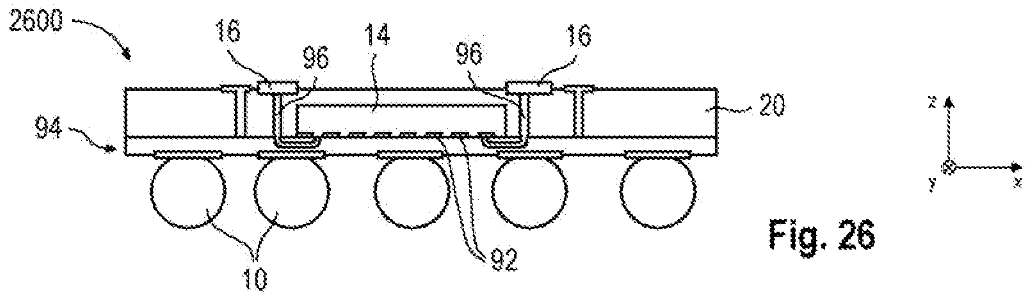
FIG. 26 schematically shows a cross-sectional side view of an RF package 2600 such as can be contained in an RF device in accordance with the disclosure.

FIG. 26 schematically shows a cross-sectional side view of an RF package 2600 such as can be contained in an RF device in accordance with the disclosure. The RF package 2600 can replace for example any of the RF packages of RF devices described above. The RF package 2600 in FIG. 26 can be a wafer level package, which can be produced, for example, in accordance with an eWLB (embedded Wafer Level Ball Grid Array) method. In this case, the underside of the RF chip 14 and the underside of the encapsulation material 20 can lie in a common plane, e.g., be arranged in a coplanar manner, on account of the production process. In some implementations, the RF package 2600 can be a fan-out package. In the implementation shown in FIG. 26, electrical contacts 92 of the RF chip 14 can face downward. An electrical connection between the RF chip 14 and the RF radiation elements 16 of the RF device 2600 can be provided via a redistribution layer 94, arranged on the undersides of the RF chip 14 and of the encapsulation material 20, and through contacts 96 extending through the encapsulation material 20.

Figure 27:
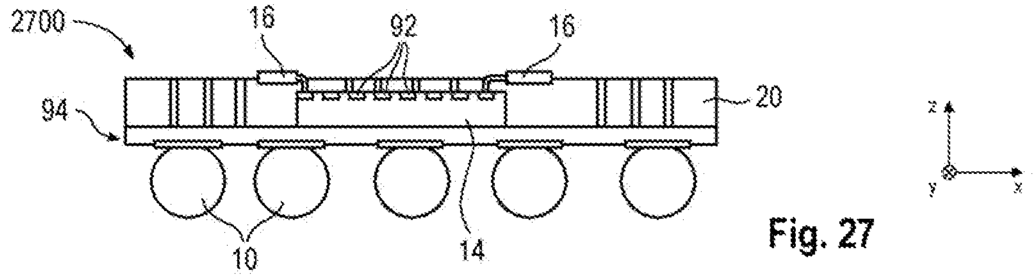
FIG. 27 schematically shows a cross-sectional side view of an RF package 2700 such as can be contained in an RF device in accordance with the disclosure.

FIG. 27 schematically shows a cross-sectional side view of an RF package 2700 such as can be contained in an RF device in accordance with the disclosure. The RF package 2700 can replace, for example, any of the RF packages of the RF devices described above. The RF package 2700 can be at least partly similar to the RF package 2600 from FIG. 26. Compared to FIG. 26, the electrical contacts of the RF chip 14 in FIG. 27 can face upward.

Figure 28:
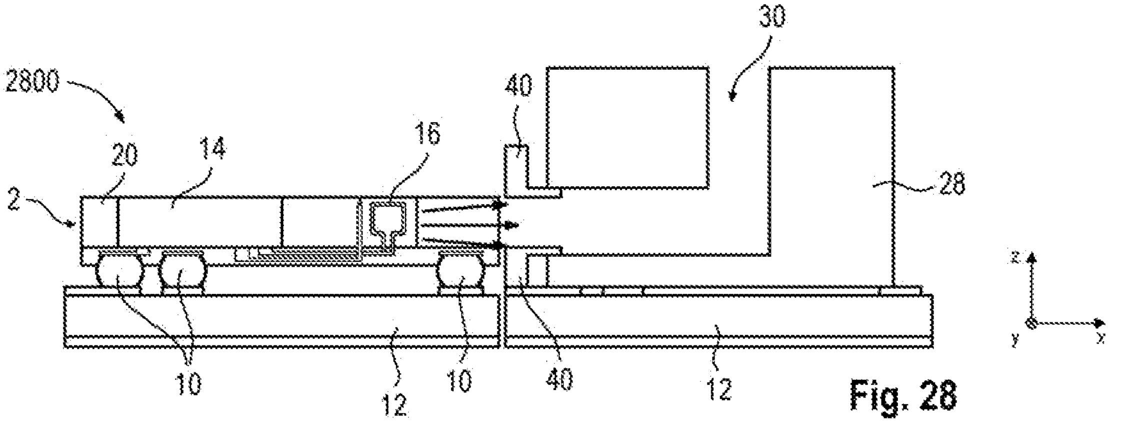
FIG. 28 schematically shows a cross-sectional side view of an RF device 2800 in accordance with the disclosure.

FIG. 28 schematically shows a cross-sectional side view of an RF device 2800 in accordance with the disclosure. The RF device 2800 can have some or all of the features of RF devices described above. In comparison with preceding examples, the waveguide component 28 or its waveguides 30 can be arranged over a side surface of the RF package 2. The RF radiation elements 16 of the RF package 2 can be configured to radiate at the side or laterally into one or more waveguides 30 of the waveguide component 28. In the implementation shown in FIG. 28, one RF radiation element 16 is illustrated by way of example in the form of a closed loop. In some implementations, the RF radiation element 16 can be embodied in any other suitable ways. The RF package 2 can be a wafer level package, for example, which can be produced in accordance with an eWLB (embedded Wafer Level Ball Grid Array) method. The RF package 2 and the waveguide component 28 can each be mechanically connected to the printed circuit board 12.

In the implementation shown in FIG. 28, the RF device 2800 can comprise one or more shielding structures in the form of one or more spring structures 40. The spring structures 40 can be aligned with the RF radiation element 16 and can bridge a gap between the RF package 2 and the waveguide component 28 or the waveguide 30. By way of example, the spring structures 40 in FIG. 28 can be similar or correspond to the spring structures of preceding implementations. In some implementations, the spring structures 40 can be replaced by one or a plurality of any other shielding structures (e.g., plug structures, metal columns, solder structures, electrically conductive foam, dielectric waveguides, etc.) as described in the preceding implementations in which the waveguide component was arranged over a top side of the RF package.

Figure 29:
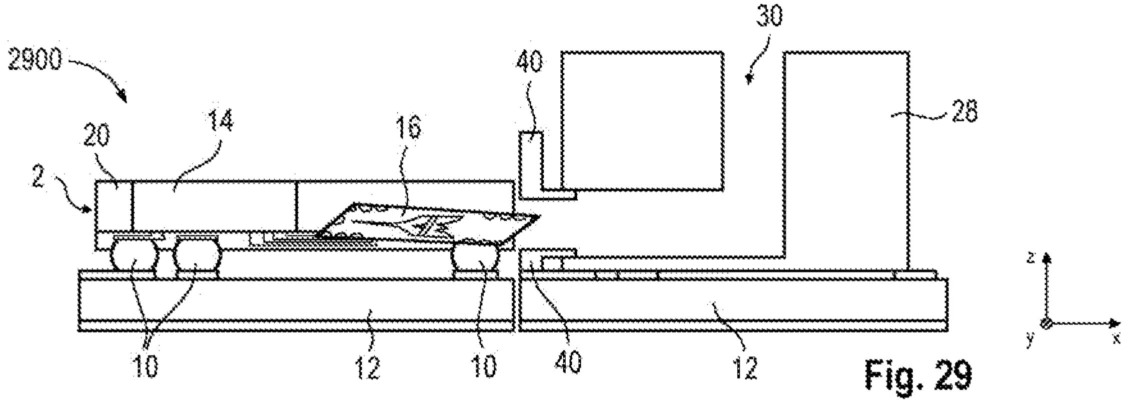
FIG. 29 schematically shows a cross-sectional side view of an RF device 2900 in accordance with the disclosure.

FIG. 29 schematically shows a cross-sectional side view of an RF device 2900 in accordance with the disclosure. The RF device 2900 can have some or all of the features of the RF device 2800 from FIG. 28. In some implementations, the RF radiation element 16 in FIG. 29 can correspond to a Vivaldi antenna or a Vivaldi-like antenna, illustrated qualitatively in FIG. 29. As viewed in the z-direction, the geometric shape of the RF radiation element 16 can be similar to the geometric shape of a Vivaldi antenna in a corresponding view. The RF radiation element 16 can have a fanned-out structure in such a view. In some implementations, the RF radiation element 16 can be similar or correspond to a coplanar Vivaldi antenna.

Figure 30:
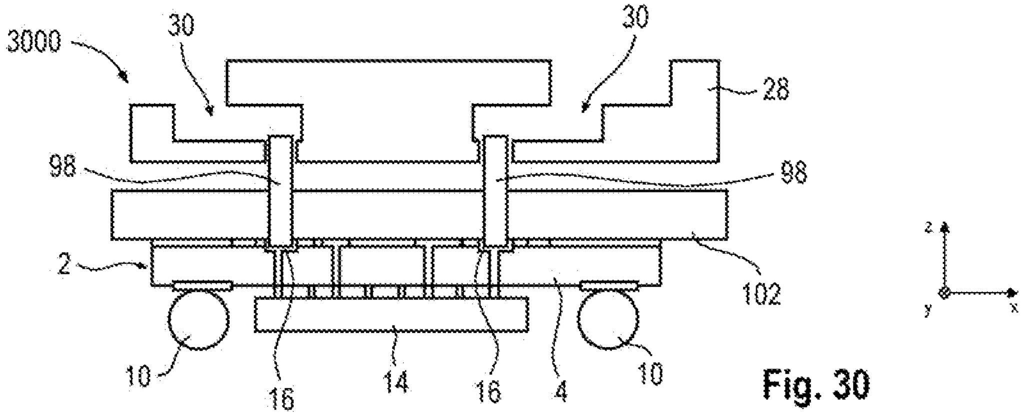
FIG. 30 schematically shows a cross-sectional side view of an RF device 3000 in accordance with the disclosure.
Figure 31:
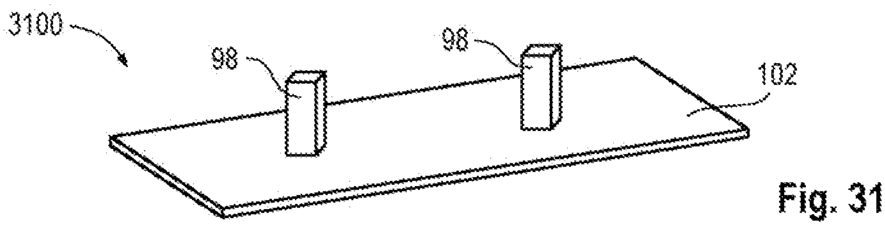
FIG. 31 schematically shows a perspective view of a shielding structure 3100 having plastic polymer fibers.

FIG. 30 schematically shows a cross-sectional side view of an RF device 3000 in accordance with the disclosure. The RF device 3000 can have some or all of the features of RF devices described above. In comparison with preceding implementations, the shielding structure of the RF device 3000 can be embodied in a different way. In the implementation shown in FIG. 30, the shielding structure can comprise one or more plastic polymer fibers 98, which can be aligned with the RF radiation elements 16 and can bridge the distance between the top side of the RF package 2 and the underside of the waveguide component 28. In the implementation shown in FIG. 30, the plastic polymer fibers 98 can optionally project a little into the waveguides 30. The plastic polymer fibers 98 can be PM (Polarization-Maintaining) fibers, for example. The plastic polymer fibers 98 can be arranged at least partly in a supporting structure 102. In this case, in the implementation shown in FIG. 30, sections of the plastic polymer fibers 98 can project from the top side of the supporting structure 102. In some implementations, side surfaces of the plastic polymer fibers 98 can be completely covered by the material of the supporting structure 102. FIG. 31 shows a perspective view of a shielding structure 3100, which can comprise the supporting structure 102 and the plastic polymer fibers 98 arranged therein.

ASPECTS

RF devices and methods for producing RF devices are explained below based on aspects.

Aspect 1 is a radio-frequency device, comprising: a printed circuit board; a radio-frequency package having a radio-frequency chip and a radio-frequency radiation element, the radio-frequency package being mounted on the printed circuit board; a waveguide component having a waveguide, wherein the radio-frequency radiation element is configured to radiate transmission signals into the waveguide and/or to receive reception signals via the waveguide; a gap arranged between a first side of the radio-frequency package and a second side of the waveguide component; and a shielding structure, which is configured: to permit a relative movement between the radio-frequency package and the waveguide component in a first direction perpendicular to the first side of the radio-frequency package, and to shield the transmission signals and/or the reception signals in such a way that a propagation of the signals via the gap is attenuated or prevented.

Aspect 2 is a radio-frequency device according to Aspect 1, wherein the shielding structure forms a waveguide configured to transfer the transmission signals and/or the reception signals between the radio-frequency radiation element and the waveguide of the waveguide component.

Aspect 3 is a radio-frequency device according to Aspect 1 or Aspect 2, wherein the gap has a width in a range of 100 micrometers to 250 micrometers in the first direction.

Aspect 4 is a radio-frequency device according to any of the preceding Aspects, wherein the shielding structure comprises: an electrically conductive layer having an opening, wherein the opening is aligned with the radio-frequency radiation element; and a spring structure surrounding the opening.

Aspect 5 is a radio-frequency device according to Aspect 4, wherein the spring structure projects from the electrically conductive layer in the first direction and bridges the gap.

Aspect 6 is a radio-frequency device according to Aspect 4 or Aspect 5, wherein the spring structure forms a mechanical buffer between the radio-frequency package and the waveguide component and is configured to shield the transmission signals and/or the reception signals in such a way that a propagation of the signals via the gap is attenuated or prevented.

Aspect 7 is a radio-frequency device according to any of Aspects 4 to 6, wherein the electrically conductive layer and the spring structure are embodied integrally.

Aspect 8 is a radio-frequency device according to any of Aspects 4 to 7, wherein the electrically conductive layer and the spring structure are embodied from at least one from a leadframe or a metallized plastic plate.

Aspect 9 is a radio-frequency device according to any of Aspects 4 to 8, furthermore comprising: a spacer arranged between the radio-frequency package and the waveguide component.

Aspect 10 is a radio-frequency device according to any of the preceding Aspects, wherein: the first side of the radio-frequency package has a cutout, and the waveguide component has a plug structure arranged on its second side, the plug structure being plugged into the cutout and bridging the gap.

Aspect 11 is a radio-frequency device according to any of Aspects 1 to 9, wherein the shielding structure comprises: an interposer arranged between the radio-frequency package and the waveguide component, the interposer having a through hole aligned with the radio-frequency radiation element.

Aspect 12 is a radio-frequency device according to Aspect 11, wherein: the waveguide component has a plug structure arranged on its second side and plugged into the through hole of the interposer, and the plug structure bridges the gap.

Aspect 13 is a radio-frequency device according to Aspect 12, wherein: the plug structure is hollow, and an inner wall of the hollow plug structure is at least partly formed by an electrically conductive material.

Aspect 14 is a radio-frequency device according to any of Aspects 11 to 13, wherein the interposer comprises at least one from a metal, a metal alloy or an electrically conductive polymer.

Aspect 15 is a radio-frequency device according to any of Aspects 11 to 14, wherein: the interposer comprises at least one from a semiconductor material, a glass material, a laminate, a mold compound or a metal film, and an inner wall of the through hole is at least partly formed by an electrically conductive material.

Aspect 16 is a radio-frequency device according to any of the preceding Aspects, wherein: the first side of the radio-frequency package has a cutout, and the waveguide component has a structure arranged on its second side, the structure projecting into the at least one cutout and bridging the gap.

Aspect 17 is a radio-frequency device according to any of the preceding Aspects, wherein the shielding structure comprises: at least one from solder structures or metal columns, which are arranged on the first side of the radio-frequency package and around the radio-frequency radiation element and bridge the gap.

Aspect 18 is a radio-frequency device according to any of the preceding Aspects, wherein the shielding structure comprises: a metal layer arranged between the radio-frequency package and the waveguide component, the metal layer having sections projecting into the waveguide of the waveguide component.

Aspect 19 is a radio-frequency device according to any of the preceding Aspects, wherein the shielding structure comprises: a metal layer arranged between the radio-frequency package and the waveguide component and having an opening, wherein the waveguide component has sections arranged on its second side and projecting into the opening of the metal layer.

Aspect 20 is a radio-frequency device according to any of the preceding Aspects, wherein the shielding structure comprises: a dielectric waveguide, which is aligned with the radio-frequency radiation element and bridges the gap.

Aspect 21 is a radio-frequency device according to any of the preceding Aspects, wherein the shielding structure comprises a compressible electrically conductive material arranged in the gap.

Aspect 22 is a radio-frequency device according to Aspect 21, wherein the compressible electrically conductive material comprises an electrically conductive foam.

Aspect 23 is a radio-frequency device according to any of the preceding Aspects, wherein the waveguide component is embodied in a multilayered injection-molded plastic assembly and the waveguide comprises a metallized hollow waveguide embodied in the injection-molded plastic assembly.

Aspect 24 is a radio-frequency device according to any of the preceding Aspects, wherein the waveguide component is mechanically connected to the printed circuit board.

Aspect 25 is a radio-frequency device according to any of the preceding Aspects, wherein the first side of the radio-frequency package is a main top side of the radio-frequency package.

Aspect 26 is a method for producing a radio-frequency device, wherein the method comprises: mounting a radio-frequency package having a radio-frequency chip and a radio-frequency radiation element on a printed circuit board; arranging a waveguide component having a waveguide, wherein the radio-frequency radiation element is configured to radiate transmission signals into the waveguide and/or to receive reception signals via the waveguide, wherein a gap is arranged between a first side of the radio-frequency package and a second side of the waveguide component; forming a shielding structure, which is configured: to permit a relative movement between the radio-frequency package and the waveguide component in a first direction perpendicular to the first side of the radio-frequency package, and to shield the transmission signals and/or the reception signals in such a way that a propagation of the signals via the gap is attenuated or prevented.

Within the meaning of the present description, the terms "connected", "coupled", "electrically connected" and/or "electrically coupled" need not necessarily mean that components must be directly connected or coupled to one another. Intervening components can be present between the "connected", "coupled", "electrically connected" or "electrically coupled" components.

Furthermore, the words "over" and "on" used for example with respect to a material layer that is formed "over" or "on" a surface of an object or is situated "over" or "on" the surface can be used in the present description in the sense that the material layer is arranged (for example formed, deposited, etc.) "directly on", for example in direct contact with, the surface meant. The words "over" and "on" used for example with respect to a material layer that is formed or arranged "over" or "on" a surface can also be used in the present text in the sense that the material layer is arranged (e.g. formed, deposited, etc.) "indirectly on" the surface meant, wherein for example one or more additional layers are situated between the surface meant and the material layer.

Insofar as the terms "have", "contain", "encompass", "with" or variants thereof are used either in the detailed description or in the claims, these terms are intended to be inclusive in a similar manner to the term "comprise". That means that within the meaning of the present description the terms "have", "contain", "encompass", "with", "comprise" and the like are open terms which indicate the presence of stated elements or features but do not exclude further elements or features. The articles "a/an" or "the" should be understood such that they include the plural meaning and also the singular meaning, unless the context clearly suggests a different understanding.

Furthermore, the word "example" is used in the present text in the sense that it serves as an example, a case or an illustration. An aspect or a configuration that is described as "example" in the present text should not necessarily be understood in the sense as though it has advantages over other aspects or configurations. Rather, the use of the word "example" is intended to present concepts in a concrete manner. Within the meaning of this application, the term "or" does not mean an exclusive "or", but rather an inclusive "or". That is to say that, unless indicated otherwise or unless a different interpretation is allowed by the context, "X uses A or B" means each of the natural inclusive permutations. That is to say if X uses A, X uses B or X uses both A and B, then "X uses A or B" is fulfilled in each of the cases mentioned above. Moreover, the articles "a/an" can be interpreted within the meaning of this application and the accompanying claims generally as "one or more", unless it is expressly stated or clearly evident from the context that only a singular is meant. Furthermore, at least one from A or B or the like generally means A or B or both A and B.

Devices and methods for producing devices are described in the present description. Observations made in connection with a device described can also apply to a corresponding method, and vice versa. If a specific component of a device is described, for example, then a corresponding method for producing the device can contain an action for providing the component in a suitable manner, even if such an action is not explicitly described or illustrated in the figures. Moreover, the features of the various example aspects described in the present text can be combined with one another, unless expressly noted otherwise.

Although the disclosure has been shown and described with respect to one or more implementations, equivalent alterations and modifications based at least in part on the reading and understanding of this description and the accompanying drawings will be apparent to the person skilled in the art. The disclosure includes all such modifications and alterations and is restricted solely by the concept of the following claims. Especially with respect to the various functions that are implemented by the above-described components (for example elements, resources, etc.), the intention is that, unless indicated otherwise, the terms used for describing such components correspond to any components which implement the specified function of the described component (which is functionally equivalent, for example), even if it is not structurally equivalent to the disclosed structure which implements the function of the example implementations of the disclosure as presented herein. Furthermore, even if a specific feature of the disclosure has been disclosed with respect to only one of various implementations, such a feature can be combined with one or more other features of the other implementations in a manner such as is desired and advantageous for a given or specific application.

The invention claimed is:

1. A radio-frequency device, comprising:

a printed circuit board;

a radio-frequency package having a radio-frequency chip and a radio-frequency radiation element, the radio-frequency package being mounted on the printed circuit board;

a waveguide component having a waveguide, wherein the radio-frequency radiation element is configured to:

one or more of:

radiate transmission signals into the waveguide, or receive reception signals via the waveguide;

a gap arranged between a first side of the radio-frequency package and a second side of the waveguide component; and a shielding structure, wherein the shielding structure is configured:

to permit a relative movement between the radio-frequency package and the waveguide component in a first direction perpendicular to the first side of the radio-frequency package, and to shield one or more of the transmission signals or the reception signals in such a way that a propagation of the one or more of the transmission signals or the reception signals via the gap is attenuated or prevented.

2. The radio-frequency device as claimed in claim 1, wherein the shielding structure forms a waveguide configured to transfer one or more of the transmission signals or the reception signals between the radio-frequency radiation element and the waveguide of the waveguide component.

3. The radio-frequency device as claimed in claim 1, wherein the shielding structure comprises:

an electrically conductive layer having an opening, wherein the opening is aligned with the radio-frequency radiation element; and a spring structure surrounding the opening.

4. The radio-frequency device as claimed in claim 3, wherein the spring structure projects from the electrically conductive layer in the first direction and bridges the gap, wherein the spring structure forms a mechanical buffer between the radio-frequency package and the waveguide component and is configured to shield one or more of the transmission signals or the reception signals to cause a propagation of the signals via the gap to be attenuated or prevented.

5. The radio-frequency device as claimed in claim 3, wherein the electrically conductive layer and the spring structure are embodied integrally.

6. The radio-frequency device as claimed in claim 3, wherein the electrically conductive layer and the spring structure are embodied from at least one from a leadframe or a metallized plastic plate.

7. The radio-frequency device as claimed in claim 3, furthermore comprising:

a spacer arranged between the radio-frequency package and the waveguide component.

8. The radio-frequency device as claimed in claim 1, wherein:

the first side of the radio-frequency package has a cutout, and the waveguide component has a plug structure arranged on the second side of the waveguide component, the plug structure being plugged into the cutout and bridging the gap.

9. The radio-frequency device as claimed in claim 1, wherein the shielding structure comprises:

an interposer arranged between the radio-frequency package and the waveguide component, the interposer having a through hole aligned with the radio-frequency radiation element, wherein the waveguide component has a plug structure arranged on the second side of the waveguide component and plugged into the through hole of the interposer, and wherein the plug structure bridges the gap.

10. The radio-frequency device as claimed in claim 9, wherein:

the plug structure is hollow, an inner wall of the hollow plug structure is at least partly formed by an electrically conductive material, and the interposer comprises at least one from a metal, a metal alloy, or an electrically conductive polymer.

11. The radio-frequency device as claimed in claim 9, wherein:

the interposer comprises at least one of a semiconductor material, a glass material, a laminate, a mold compound, or a metal film, and an inner wall of the through hole is at least partly formed by an electrically conductive material.

12. The radio-frequency device as claimed in claim 1, wherein:

the waveguide component has a structure arranged on a side of the waveguide component, the structure bridging the gap arranged between the first side of the radio-frequency package and the second side of the waveguide component.

13. The radio-frequency device as claimed in claim 1, wherein the shielding structure comprises a compressible electrically conductive material arranged in the gap, wherein the compressible electrically conductive material comprises an electrically conductive foam.

14. The radio-frequency device as claimed in claim 1, wherein the waveguide component is embodied in a multilayered injection-molded plastic assembly and the waveguide comprises a metallized hollow waveguide embodied in the multilayered injection-molded plastic assembly.

15. The radio-frequency device as claimed in claim 1, wherein the first side of the radio-frequency package is a main top side of the radio-frequency package.

16. A method for producing a radio-frequency device, wherein the method comprises:

mounting a radio-frequency package having a radio-frequency chip and a radio-frequency radiation element on a printed circuit board;

arranging a waveguide component having a waveguide, wherein the radio-frequency radiation element is configured to:

one or more of:

radiate transmission signals into the waveguide, or receive reception signals via the waveguide, wherein a gap is arranged between a first side of the radio-frequency package and a second side of the waveguide component; and forming a shielding structure, wherein the shielding structure is configured:

to permit a relative movement between the radio-frequency package and the waveguide component in a first direction perpendicular to the first side of the radio-frequency package, and to shield one or more of the transmission signals or the reception signals to cause a propagation of the one or more of the transmission signals or the reception signals via the gap to be attenuated or prevented.

17. The method as claimed in claim 16, wherein the shielding structure forms a waveguide configured to transfer one or more of the transmission signals or the reception signals between the radio-frequency radiation element and the waveguide of the waveguide component.

18. The method as claimed in claim 16, wherein the shielding structure comprises:

an electrically conductive layer having an opening, wherein the opening is aligned with the radio-frequency radiation element; and a spring structure surrounding the opening.

19. The method as claimed in claim 18, wherein the spring structure projects from the electrically conductive layer in the first direction and bridges the gap, wherein the spring structure forms a mechanical buffer between the radio-frequency package and the waveguide component and is configured to shield one or more of the transmission signals or the reception signals to cause a propagation of the signals via the gap to be attenuated or prevented.

20. The method as claimed in claim 18, wherein the electrically conductive layer and the spring structure are embodied integrally.

* * * * *